(12) United States Patent
Masuoka et al.

(10) Patent No.: US 11,026,088 B2
(45) Date of Patent: Jun. 1, 2021

(54) COMMUNICATION SYSTEM, COMMUNICATION DEVICE AND COMMUNICATION TERMINAL DEVICE

(71) Applicant: Maxell, Ltd., Kyoto (JP)

(72) Inventors: Nobuo Masuoka, Osaka (JP); Yasunobu Hashimoto, Osaka (JP); Kazuhiko Yoshizawa, Osaka (JP); Motoyuki Suzuki, Osaka (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 15/504,668

(22) PCT Filed: Aug. 29, 2014

(86) PCT No.: PCT/JP2014/072783
§ 371 (c)(1),
(2) Date: Feb. 17, 2017

(87) PCT Pub. No.: WO2016/031062
PCT Pub. Date: Mar. 3, 2016

(65) Prior Publication Data
US 2017/0280327 A1 Sep. 28, 2017

(51) Int. Cl.
*H04W 12/08* (2021.01)
*H04W 12/06* (2021.01)
(Continued)

(52) U.S. Cl.
CPC ......... *H04W 12/08* (2013.01); *H04L 63/0838* (2013.01); *H04W 12/06* (2013.01);
(Continued)

(58) Field of Classification Search
CPC ..... H04W 12/08; H04W 76/10; H04W 12/04; H04W 12/06; H04W 76/00; H04W 84/12; H04W 12/50; H04L 63/0838
(Continued)

(56) References Cited

U.S. PATENT DOCUMENTS 6,624,854 B1 * 9/2003 Isogai ................. H04N 9/3105
348/705
8,560,976 B1 * 10/2013 Kim ................. H04N 21/42228
715/863
(Continued)

FOREIGN PATENT DOCUMENTS

JP 2005-051314 A 2/2005
JP 2008-042882 A 2/2008
(Continued)

OTHER PUBLICATIONS

International Search Report of PCT/JP2014/072783 dated Nov. 25, 2014.
(Continued)

*Primary Examiner* — Aravind K Moorthy
(74) *Attorney, Agent, or Firm* — Mattingly & Malur, PC

(57) ABSTRACT

A wireless LAN communication system which achieves convenience where a terminal of a user who is external to an organization can temporarily use the system while ensuring security. For example, a first terminal is used by a user internal to an organization and a second terminal is used by a user external to the organization. A communication device has a display function and the first terminal connects to the communication device via a wireless LAN access point device. The second terminal connects, under permission from the first terminal, to the communication device via the wireless LAN access point. The second terminal uses the display function of the communication device through the connection via the wireless LAN access point. The first terminal and the communication device confirm whether the permission is to be continued or terminated to make the second terminal unable to use the display function.

15 Claims, 13 Drawing Sheets

(51) Int. Cl.
| | | |
|---|---|---|
| H04W 76/00 | (2018.01) | |
| H04W 12/50 | (2021.01) | |
| H04W 76/10 | (2018.01) | |
| H04L 29/06 | (2006.01) | |
| H04W 84/12 | (2009.01) | |

(52) U.S. Cl.
CPC ........... *H04W 12/50* (2021.01); *H04W 76/00* (2013.01); *H04W 76/10* (2018.02); *H04W 84/12* (2013.01)

(58) Field of Classification Search
USPC .......................................................... 726/4
See application file for complete search history.

(56) References Cited

U.S. PATENT DOCUMENTS

| | | | | |
|---|---|---|---|---|
| 9,094,052 | B1* | 7/2015 | Hsu | H04B 5/0031 |
| 2002/0159035 | A1* | 10/2002 | Koyama | H04N 9/3147 |
| | | | | 353/31 |
| 2002/0196378 | A1* | 12/2002 | Slobodin | H04N 1/4177 |
| | | | | 348/744 |
| 2003/0051139 | A1* | 3/2003 | Kubota | G06F 21/84 |
| | | | | 713/168 |
| 2004/0227900 | A1* | 11/2004 | Sato | G06F 21/84 |
| | | | | 353/30 |
| 2004/0267981 | A1* | 12/2004 | Kakemura | H04L 67/38 |
| | | | | 710/48 |
| 2005/0036509 | A1* | 2/2005 | Acharya | H04N 21/43637 |
| | | | | 370/466 |
| 2005/0091359 | A1* | 4/2005 | Soin | G09G 5/006 |
| | | | | 709/223 |
| 2005/0160479 | A1* | 7/2005 | Kubota | H04L 65/403 |
| | | | | 726/16 |
| 2005/0166239 | A1* | 7/2005 | Uchikubo | G16H 30/20 |
| | | | | 725/78 |
| 2005/0215283 | A1* | 9/2005 | Camp, Jr. | H04N 1/00127 |
| | | | | 455/556.2 |
| 2006/0098174 | A1* | 5/2006 | Ohuchi | H04N 21/4367 |
| | | | | 353/122 |
| 2007/0008307 | A1* | 1/2007 | Lokkeberg | G06F 1/1616 |
| | | | | 345/204 |
| 2008/0044024 | A1 | 2/2008 | Oh et al. | |
| 2009/0109015 | A1* | 4/2009 | Ueno | G06F 21/74 |
| | | | | 340/500 |
| 2010/0083388 | A1* | 4/2010 | Murayama | H04L 12/12 |
| | | | | 726/36 |
| 2010/0091987 | A1* | 4/2010 | Takahashi | G06F 21/84 |
| | | | | 380/44 |
| 2010/0302465 | A1* | 12/2010 | Shoji | H04N 21/4753 |
| | | | | 348/744 |
| 2010/0323682 | A1* | 12/2010 | Hatayama | H04H 20/08 |
| | | | | 455/422.1 |
| 2011/0237191 | A1* | 9/2011 | Saito | H04W 76/34 |
| | | | | 455/41.2 |
| 2012/0007841 | A1* | 1/2012 | Nakamura | G06F 21/31 |
| | | | | 345/204 |
| 2012/0040720 | A1* | 2/2012 | Zhang | G06F 3/1454 |
| | | | | 455/557 |
| 2012/0068812 | A1* | 3/2012 | Yamamoto | H04W 12/37 |
| | | | | 340/5.1 |
| 2012/0113459 | A1* | 5/2012 | Williams | G06F 3/1244 |
| | | | | 358/1.15 |
| 2012/0169760 | A1* | 7/2012 | Mochizuki | G06F 21/88 |
| | | | | 345/618 |
| 2013/0057591 | A1* | 3/2013 | Sugiyama | H04W 48/20 |
| | | | | 345/671 |
| 2013/0083919 | A1* | 4/2013 | Sobue | G06F 21/62 |
| | | | | 380/28 |
| 2013/0143651 | A1* | 6/2013 | Harrison | H04W 12/50 |
| | | | | 463/31 |
| 2013/0221084 | A1* | 8/2013 | Doss | H04L 63/0492 |
| | | | | 235/375 |
| 2013/0238684 | A1* | 9/2013 | Patil | G06F 9/452 |
| | | | | 709/203 |
| 2013/0321781 | A1* | 12/2013 | Aruga | G03B 21/142 |
| | | | | 353/94 |
| 2014/0025744 | A1* | 1/2014 | Kim | G06F 3/1454 |
| | | | | 709/204 |
| 2014/0133694 | A1* | 5/2014 | Mishra | H04N 1/00129 |
| | | | | 382/100 |
| 2014/0150085 | A1* | 5/2014 | Furuichi | G06F 21/36 |
| | | | | 726/17 |
| 2014/0152595 | A1* | 6/2014 | Suzuki | G09G 5/006 |
| | | | | 345/173 |
| 2014/0164930 | A1* | 6/2014 | Lieb | H04W 12/06 |
| | | | | 715/730 |
| 2014/0197232 | A1* | 7/2014 | Birkler | G06Q 20/3276 |
| | | | | 235/375 |
| 2014/0233443 | A1* | 8/2014 | Kumar | H04L 12/12 |
| | | | | 370/311 |
| 2014/0245194 | A1* | 8/2014 | Wright | G06F 3/01 |
| | | | | 715/761 |
| 2014/0325361 | A1* | 10/2014 | Lee | H04M 1/72533 |
| | | | | 715/730 |
| 2014/0337503 | A1* | 11/2014 | Hefetz | G06Q 20/32 |
| | | | | 709/223 |
| 2014/0354611 | A1* | 12/2014 | Monden | H04N 21/440245 |
| | | | | 345/204 |
| 2015/0160787 | A1* | 6/2015 | Haggar | G06Q 10/103 |
| | | | | 715/740 |
| 2015/0304336 | A1* | 10/2015 | Yu | H04L 63/102 |
| | | | | 726/4 |
| 2015/0304725 | A1* | 10/2015 | Itagaki | H04N 21/4532 |
| | | | | 725/25 |
| 2015/0327310 | A1* | 11/2015 | Miura | H04W 76/14 |
| | | | | 455/41.2 |
| 2015/0365234 | A1* | 12/2015 | Marten | G06F 21/36 |
| | | | | 713/183 |
| 2016/0006864 | A1* | 1/2016 | Park | H04N 21/64322 |
| | | | | 715/835 |

FOREIGN PATENT DOCUMENTS

| | | |
|---|---|---|
| JP | 2013-175989 A | 9/2013 |
| JP | 2014-60624 A | 4/2014 |

OTHER PUBLICATIONS

Japanese Office Action received in corresponding Japanese Application No. 2018-052030 dated Apr. 16, 2019.

Mukai, J. et al., "Issuing and Managing Wi-Fi Guest Accounts for Android Smartphones by Exploiting Information of Proximity between Terminals", The Institute of Electronics, Information and Communication Engineers Technical Report, Jan. 16, 2014, vol. 113, No. 398.

Horikoshi, I., "Network Construction Learned on Site", Nikkei Communications, Oct. 30, 2012, pp. 46-49, No. 586, Nikkei Business Publications Inc.

* cited by examiner

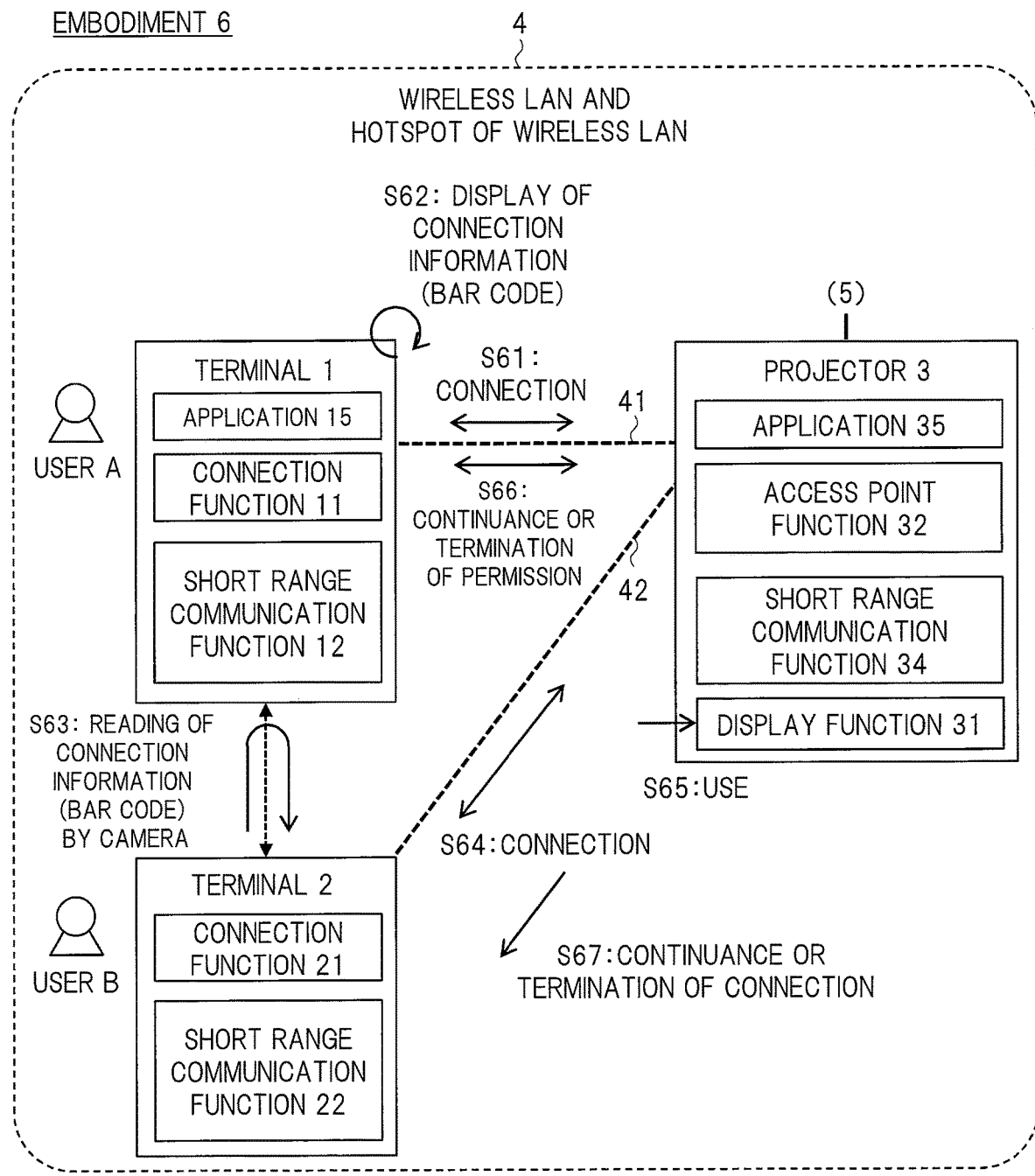

COMMUNICATION SYSTEM, COMMUNICATION DEVICE AND COMMUNICATION TERMINAL DEVICE

TECHNICAL FIELD

The present invention relates to communication and information processing technologies. Furthermore, the present invention relates to the technologies of a wireless LAN, a projector, and the like.

BACKGROUND ART

Conventionally, there has been, as an example of a wireless LAN communication system in an organization, such as a company, a communication system in which a terminal of a user who is internal to a company wirelessly connects to a communication device which has a wireless LAN access point function. The terminal of the user who is internal to the company wirelessly connects to the communication device which has the access point function and uses a predetermined function of the communication device.

An example of the conventional technologies which relate to a wireless LAN communication system is described in Japanese Unexamined Patent Application Publication No. 2005-51314A (Patent Document 1). Patent Document 1 describes that, in a wireless LAN system where a client terminal of a user and a communication device, which is a wireless LAN access point, wirelessly connect to each other, a time period in which the client terminal is allowed to connect to the access point is set, and security is ensured by a control based on this time restriction.

RELATED ART DOCUMENTS

Patent Documents

Patent Document 1: Japanese Unexamined Patent Application Publication No. 2005-51314

SUMMARY OF THE INVENTION

Problems to be Solved by the Invention

The above-described wireless LAN communication system is assumed to encounter not only a situation where a terminal of a user who is internal to an organization connects to and uses a communication device which has an access point function, but also a situation where a terminal of a user who is external to the organization connects to and uses the same communication device. For example, in a meeting at a company or the like, a user who is internal to the company allows an invited user who is external to the company to temporarily use a wireless LAN communication system inside the company. Specifically, the terminal of the user who is external to the company temporarily connects to the communication device which has an access point function and uses a predetermined function.

Such a wireless LAN communication system by which the functions corresponding to the above-described situations of use are achieved is advantageous in terms of convenience. However, such a system has a possibility that a terminal of a user who is external to an organization can independently use the wireless LAN communication system inside the organization after a temporary use. In other words, the above-described wireless LAN communication system has a problem in terms of a balance between convenience and security.

An object of the present invention is to provide a technology pertaining to a wireless LAN communication system, a communication device in the system, and the like, which can achieve convenience for a terminal of a user who is external to an organization to temporarily use the system and ensure security in such a case.

Means for Solving the Problems

A representative embodiment of the present invention is a communication system and the like and is characterized by including the following configuration.

A communication system of an embodiment includes: a first communication terminal device having a wireless LAN connection function, a second communication terminal device having a wireless LAN connection function, and a communication device having a wireless LAN access point function and a display function. The first communication terminal device connects to the communication device via a wireless LAN. The second communication terminal device connects, under permission from the first communication terminal device, to the communication device via the wireless LAN and uses the display function of the communication device through the connection. The first communication terminal device and the communication device communicate with each other to confirm whether the permission for the second communication terminal device to connect to and use the communication device is to be continued or terminated. In response to a termination of the permission, the communication device terminates the connection with the second communication terminal device via the wireless LAN to make the second communication terminal device unable to use the display function.

Effects of the Invention

The representative embodiment of the present invention, pertaining to a wireless LAN communication system, a communication device in the system, and the like, can achieve convenience for a terminal of a user who is external to an organization to temporarily use the system and ensure security in such a case.

BRIEF DESCRIPTIONS OF THE DRAWINGS

FIG. 13 is a diagram illustrating a configuration and process sequence of a communication system of Embodiment 6 of the present invention.

DETAILED DESCRIPTION OF PREFERRED EMBODIMENTS

Embodiments of the present invention will be described below in detail on the basis of the drawings. Note that the same reference signs are principally assigned to the same elements throughout the drawings for illustrating the embodiments, and repetitive descriptions thereof are omitted.

Communication systems of the embodiments provide the function of temporarily connecting, under permission from a terminal of a user who is internal to a company, a terminal of a user who is external to the company, to a projector which has a wireless LAN access point function and enabling the terminal of the user who is external to the company to use a display function of the projector.

First, a configuration practically common to the embodiments is described with reference to FIG. 1 to FIG. 4, followed by characteristics of the individual embodiments described in order.

[Communication System]

Figure 1:
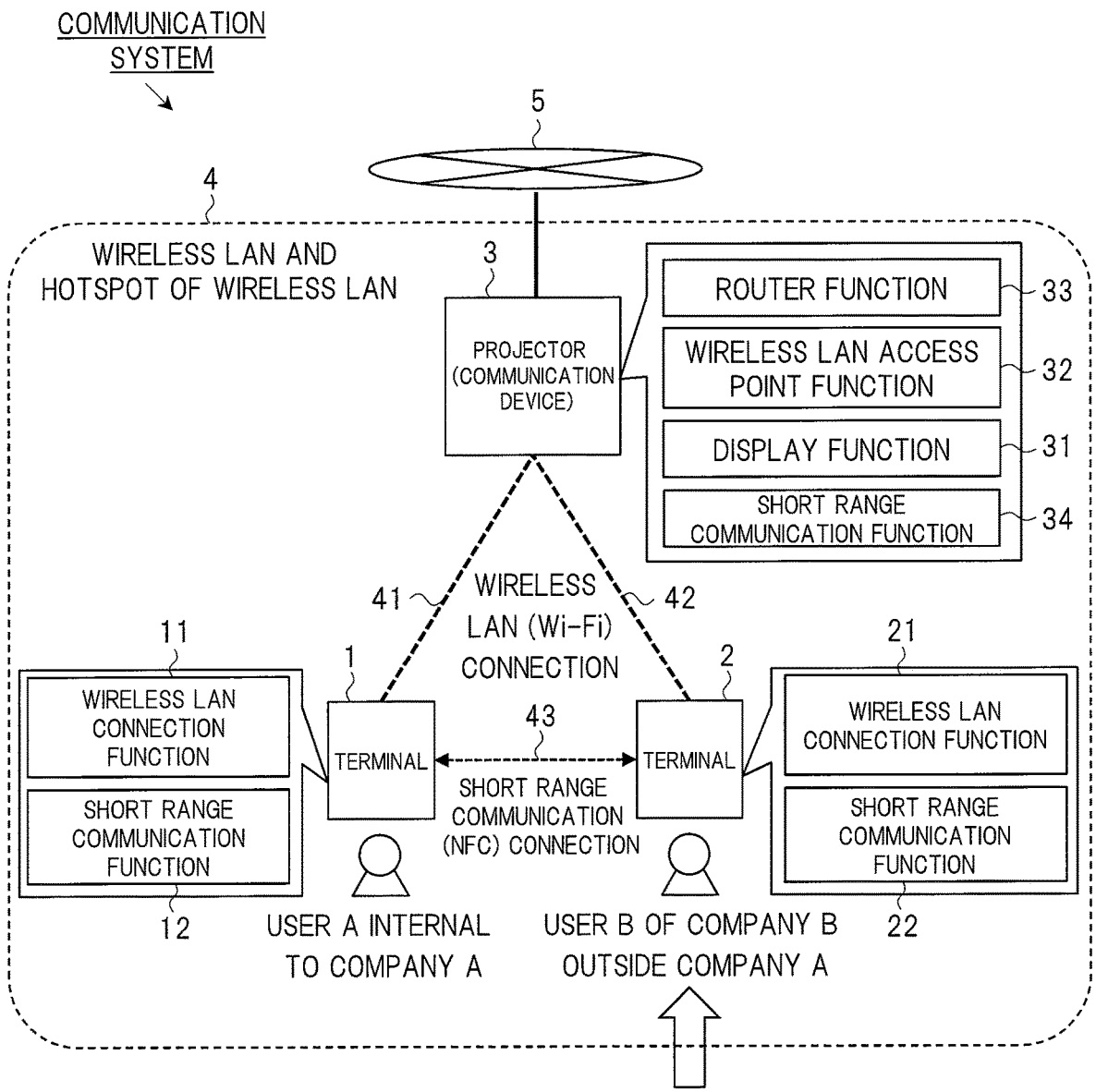
FIG. 1 is a diagram illustrating a configuration of a communication system of an embodiment of the present invention.

FIG. 1 illustrates a configuration of a communication system of an embodiment. The communication system in FIG. 1 is a system including a wireless LAN 4. The communication system further includes a projector 3, which is a communication device, a terminal 1, which is a first communication terminal device, and a terminal 2, which is a second communication terminal device. The projector 3 is connected to the terminal 1 and terminal 2 via the wireless LAN 4. The projector 3 is connected to a communication network 5. A connection 41 via the wireless LAN is established between the projector 3 and the terminal 1. A connection 42 via the wireless LAN is established between the projector 3 and the terminal 2. A connection 43 using short range communication is established between the terminal 1 and the terminal 2.

The wireless LAN 4 is a wireless LAN compliant with a predetermined communication standard. Although Wi-Fi is applied as the communication standard of the wireless LAN 4 in the present embodiment, any communication standard is applicable without being limited to Wi-Fi. Wi-Fi, i.e., wireless fidelity, is a term indicating that interconnections between devices in accordance with the international standard, IEEE 802.11, are approved. The wireless LAN 4 is illustrated with a hotspot thereof. The hotspot is a space in which wireless connections are possible around the projector 3, which is a communication device serving as an access point in the wireless LAN 4.

The wireless LAN 4 is a wireless LAN established inside a company A, which is an organization, and the projector 3 and the terminal 1 of a user A, which are elements constituting the wireless LAN 4, are under the management of the company A. The terminal 2 of a user B is outside the management of the company A. FIG. 1 illustrates a case where the terminal 1 of the user A who is internal to the company A and the terminal 2 of the user B of a company B outside the company A are located within the hotspot of the wireless LAN 4.

The communication network 5 indicates a wired intra-company LAN in the company A, which is an organization, the Internet which is an external network to which connections are established via the intra-company LAN, and the like.

The projector 3 is a device serving both as a projection type display device and a communication device serving as an access point of the wireless LAN 4. The projector 3 includes a display function 31, a wireless LAN access point function 32, a router function 33, and the like.

The display function 31 is the function of projecting and displaying a moving image or a still image on a screen for the projector 3. The wireless LAN access point function 32 is the function of establishing a wireless connection to a communication terminal device via the wireless LAN 4 compliant with Wi-Fi standards. The router function 33 is the function of performing routing for a connection to the communication network 5 and includes layer-2 and layer-3 protocol processing functions.

Note that the projector 3 includes a short range communication function 34 in, for example, Embodiment 4 to be described later. The short range communication function 34 is the function of performing short range communication with a communication terminal device.

The user A, such as an employee who is internal to the company A, possesses and uses the terminal 1. Note that not only the user A but also another user such as another employee of the company A can similarly establish a connection to the wireless LAN 4 with a communication terminal device. The user B, such as an employee of the company B outside the company A, possesses and uses the terminal 2. Any of various kinds of communication terminal devices including a smartphone, a tablet terminal, a laptop computer, and the like can be used as each of the terminal 1 and the terminal 2.

The terminal 1 includes a wireless LAN connection function 11 and a short range communication function 12. Similarly, the terminal 2 includes a wireless LAN connection function 21 and a short range communication function 22. The wireless LAN connection function 11 is the function of establishing the Wi-Fi connection 41 via the wireless LAN 4 to the access point function 32 of the projector 3 and performing wireless communication, such as data communication, with the connection 41 established. Similarly, the wireless-LAN connection function 21 is the function of establishing the Wi-Fi connection 42 to the access point function 32 of the projector 3.

The connection 43 using short range communication is possible between the short range communication function 12 of the terminal 1 and the short range communication function 22 of the terminal 2. In the present embodiment, NFC, i.e., near field communication, which has a narrow definition of short range communication, is applied as the short range communication. However, any type of short range communication is applicable without being limited to NFC. NFC is also called non-contact communication, and examples of the standards of NFC are Felica (registered trademark), ISO/IEC 14443, and ISO/IEC 18092. The short range communication may be, for example, Bluetooth (registered trademark) or may be any communication using infrared rays or audio other than the above types of communication using radio waves.

The terminal 1 of the user A can use the display function 31 with the connection 41 to the projector 3 established. Specifically, the user A can transmit data, such as material retained in the terminal 1, to the projector 3 through the connection 41 to cause the display function 31 of the projector 3 to display the data on the screen. In the present embodiment, the terminal 2 of the extra-company user B can establish the connection 42 to the projector 3 under permission from the terminal 1 of the intra-company user A to temporarily use the display function 31 of the projector 3. Specifically, the user B can transmit data, such as material retained in the terminal 2, to the projector 3 through the connection 42 to cause the display function 31 of the projector 3 to display the data on the screen.

Moreover, the terminal 1 of the user A can connect to the communication network 5 by using the router function 33 with the connection 41 to the projector 3 established. Specifically, the user A can access, for example, a server on an intra-company LAN or a server on the Internet with the terminal 1 to, for example, download and upload data from and to the server.

In the present embodiment, the terminal 2 of the extra-company user B can establish the connection 42 to the projector 3 under permission from the terminal 1 of the intra-company user A to connect to the communication network 5 through the temporary use of the router function 33 of the projector 3. Specifically, the user B can access, for example, a server on the Internet with the terminal 2 to, for example, download and upload data from and to the server. Note that, from a security viewpoint, a fire wall server or the like is usually set up to prevent the terminal 2 of the extra-company user B from connecting to the communication network 5 such as an intra-company LAN.

In the present embodiment, the projector 3, which is a type display device, serves as a communication device constituting the wireless LAN 4, and the display function 31 and the router function 33 serve as the functions which are temporarily used by the terminal 2 of the extra-company user B. Without being limited to the above, the communication device constituting the wireless LAN 4 may be a monitor device or a television device, which is a non-projection type display device, or may be a device providing a function other than the display function 31, in other embodiments. When it is assumed that the projector 3 is replaced with a different device and the display function 31 is replaced with a different function, the communication system of the present embodiment includes the different function of the different device as a predetermined function for permission to be given. The display function 31 may be a display function of displaying a moving image or a still image on a display screen formed of a liquid crystal panel. The different function may be the function of receiving a broadcast in the form of radio waves and displaying the broadcast.

Other embodiments may have a configuration in which the router function 13 of the projector 3 is omitted, in other words, a configuration in which the projector 3 and the communication network 5 do not connect to each other. The use of the router function 33 by the terminal 2 of the user B may be allowed under permission from the terminal 1 of the user A or may be forbidden due to non-permission from the terminal 1 in accordance with the setting function of the present embodiment.

In the above configuration, the connection 41 between the terminal 1 and the projector 3 is a wireless connection as an example. However, the connection 41 may be a wired connection.

[Overview of Use]

Figure 2:
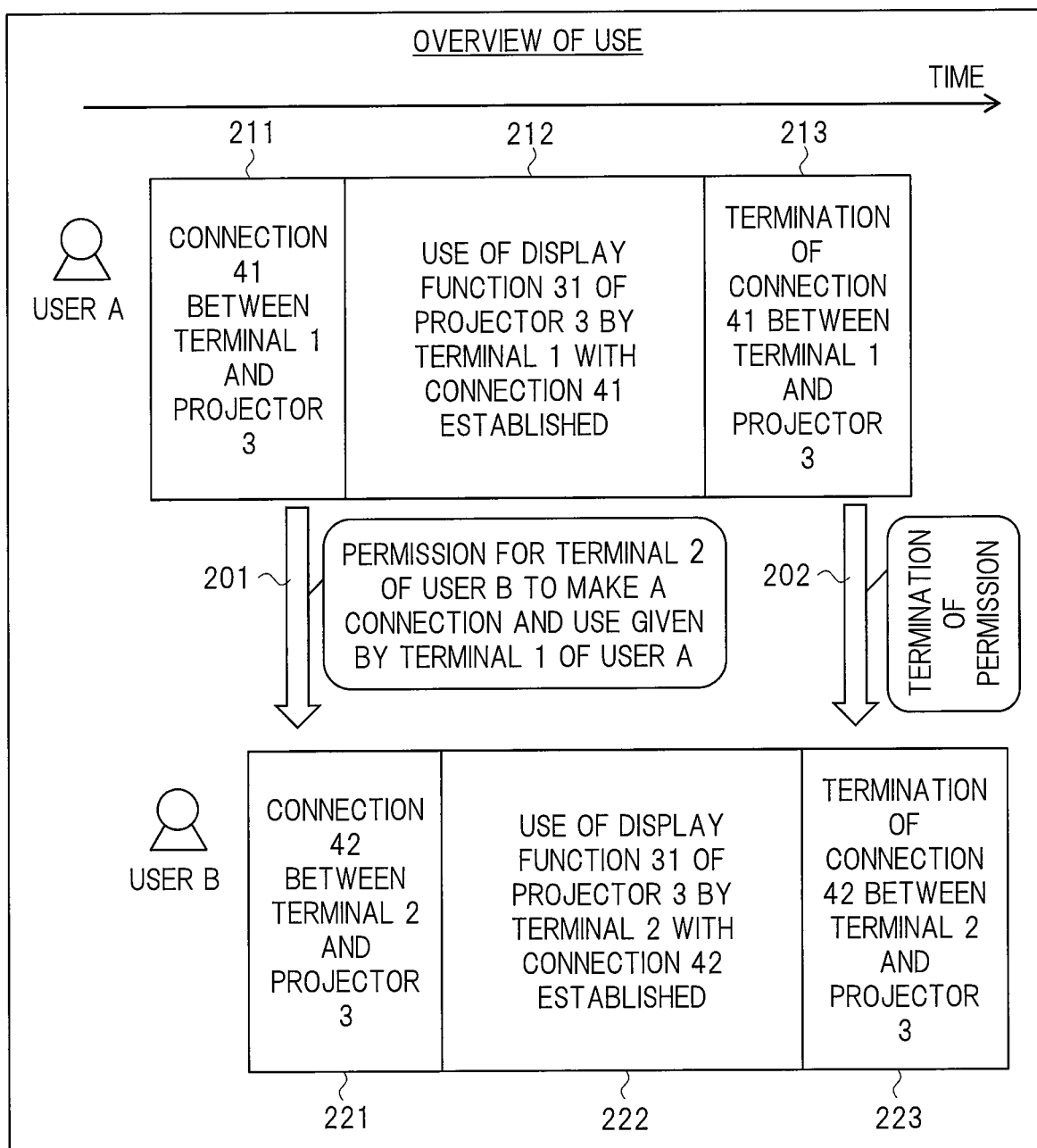
FIG. 2 is a diagram illustrating an overview of use in the communication system of the embodiment.

An overview of use including situations of use regarding the communication system of the embodiment is described with reference to FIG. 2. FIG. 2 illustrates an overview of use in the communication system of the embodiment along a time axis. As an example of situations of use, the projector 3, which is an access point of the wireless LAN 4 as in FIG. 1, is placed in a building of the company A. In a hotspot of the wireless LAN 4 in the building of the company A where the projector 3 is placed, the user A of the company A and the invited user B of the company B have a meeting.

First, assume that the user A wirelessly connects his/her own terminal 1 to the projector 3 to use the display function 31 and the like of the projector 3, as indicated by 211 to 213. 211 indicates the process of establishing the connection 41 via the wireless LAN 4 by using the connection function 11 of the terminal 1 of the user A and the access point function 32 of the projector 3. 212 indicates the process and the time of using the display function 31 of the projector 3 from the terminal 1 with the connection 41 established. 213 indicates the process of terminating the connection 41 via the wireless LAN 4 by using the connection function 11 of the terminal 1 of the user A and the access point function 32 of the projector 3.

201 indicates permission from the terminal 1 of the user A for the terminal 2 of the user B to connect to and use the projector 3. The user A gives the permission indicated by 201 under the condition that the terminal 1 of the user A and the terminal 2 of the user B are located close to each other and the user A knows the existence of the user B at a time, for example, at the start of the meeting or during the process indicated by 211. Operations and processes for the permission are described in detail in each embodiment.

The user B wirelessly connects the terminal 2 to the projector 3 under the permission indicated by 201 to use the display function 31 and the like of the projector 3 as indicated by 221 to 223. 221 indicates the process of establishing the connection 42 via the wireless LAN 4 by using the connection function 21 of the terminal 2 of the user B and the access point function 32 of the projector 3. 222 indicates the process and the time of using the display function 31 of the projector 3 from the terminal 2 with the connection 42 established. 223 indicates the process of terminating the connection 42 via the wireless LAN 4 by using the connection function 21 of the terminal 2 of the user B and the access point function 32 of the projector 3.

202 indicates termination of the permission from the terminal 1 of the user A for the terminal 2 of the user B to connect to and use the projector 3. The user A terminates the permission as indicated by 202 under the condition that the connection 41 between the terminal 1 of the user A and the projector 3 is terminated at a time, for example, at the end of the meeting or during the process indicated by 213. The termination of the permission terminates the connection 42 between the terminal 2 of the user B and the projector 3 as indicated by 223. Thereafter, the terminal 2 of the user B does not have permission and is hence unable to independently connect to and use the projector 3 as in 221 and 222.

Note that FIG. 2 illustrates an example in which the terminal 1 of the user A first uses the display function 31 of the projector 3 and the terminal 2 of the user B subsequently uses the display function 31 of the projector 3 in parallel with the use by the terminal 1 of the user A in terms of time. Without being limited to the above configuration, the processes indicated by 211 and 212 may first be carried out and terminated by the terminal 1 of the user A, and thereafter the processes indicated by 221 to 223 may be carried out by the terminal 2 of the user B, for example. In this case, the terminal 1 of the user A has stopped using the display function 31 while continuing the connection 41 to the projector 3.

Moreover, in FIG. 2, termination of permission 202 is performed under the condition that the connection 41 between the terminal 1 of the user A and the projector 3 has been terminated. However, the termination of permission 202 may be performed through an operation by the user A or the like to terminate the connection 42 between the terminal 2 and the projector 3, with the connection 41 established.

[Communication Device]

Figure 3:
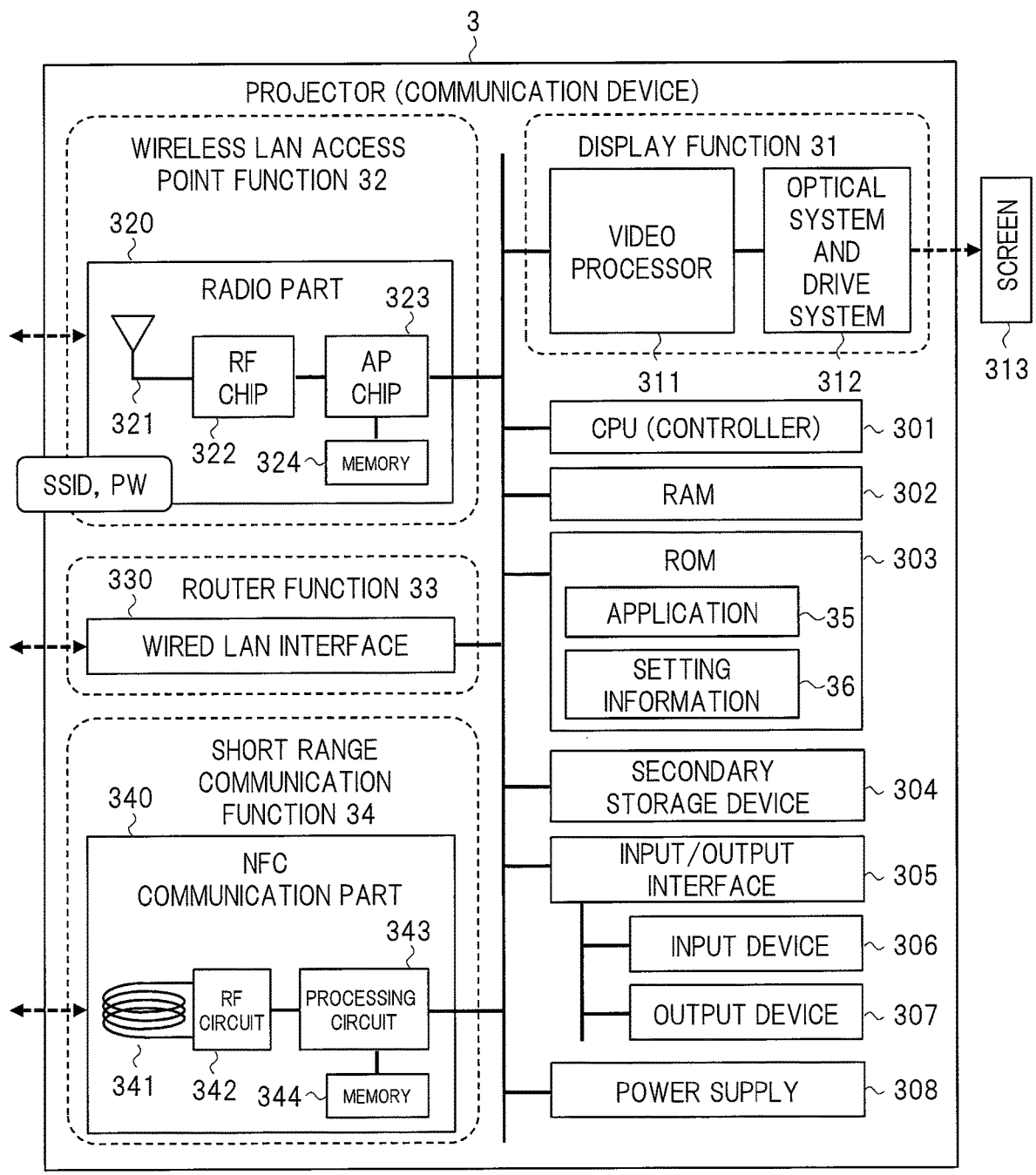
FIG. 3 is a diagram illustrating a configuration of a projector which is a communication device of the embodiment.

FIG. 3 illustrates a configuration of the projector 3, which is a communication device of the embodiment. The projector 3 in FIG. 3 is a projection type video display device, such as a liquid crystal projector. The projector 3 may be a small portable device or a stationary device. The projector 3 corresponds to a stand-alone projector which has a control function therein for display control in this embodiment. However, the projector 3 may be a system type projector configured to connect to an external device which has a control function thereof. With the latter type, the projector 3 is connected to an external device, such as a PC, receives a command or the like from the external device, and then performs display control in accordance with the command or the like.

The projector 3 has a configuration in which a CPU 301, a RAM 302, a ROM 303, a secondary storage device 304, an input/output interface 305, an input device 306, an output device 307, a power supply 308, a video processor 311, an optical system and drive system 312, a radio part 320, a wired LAN interface 330, an NFC communication part 340, and the like are connected to each other via a bus.

The CPU 301 is a controller which performs processes for controlling the entire projector 3 including control of the display function 31, the access point function 32, and the like. The RAM 302 is a memory which stores processing data and the like. The ROM 303 is a memory which stores an application 35, which is a control program, setting information 36, and the like. The CPU 301 loads a control program from the ROM 303 into the RAM 302 and executes the program to carry out each process.

The application 35 carries out a process for implementing functions unique to the projector 3 of the present embodiment. The CPU 301 carries out software processing of the application 35. In the setting information 36, data and information for implementing the functions unique to the projector 3 of the present embodiment are set. The application 35 and the setting information 36 may be stored in the secondary storage device 304, a memory in the radio part 320, or the like.

The secondary storage device 304 is a memory card, a disk, or the like and stores video data and the like. The input/output interface 305 connects to an input device 306 and an output device 307 of various kinds and carries out input/output interface processes. The power supply 308 supplies power to each of the elements of the projector 3. The power supply 308 turns the power on or off in response to a user operation.

The projector 3 causes the display function 31 to convert data to be displayed into a video signal for projection and to project and display a video on a screen 313 on the basis of the video signal. The display function 31 includes, as main components, the video processor 311, and the optical system and drive system 312 in addition to the controller 301. The video processor 311 carries out a process for selecting and reading data to be displayed from the radio part 320 or the like and converting the data into a video signal for projection onto the screen 313, and the like.

The optical system and drive system 312 include, for example, various optical components including a lamp, a liquid crystal panel device, a projection lens, a reflection mirror, and the like, and the drive circuits thereof. The optical system is driven on the basis of the video signal for projection. With this configuration, the optical system and drive system 312 emit light corresponding to the video signal and project the light through the projection lens onto the screen 313 to display the video.

The wireless LAN access point function 32 allows the projector 3 as an access point to directly connect to the communication terminal device in a wireless transmission system. The projector 3 includes the radio part 320 as a component of the access point function 32. The radio part 320 is a wireless LAN interface compliant with the Wi-Fi standards and is a module composed of an LSI or the like, which carries out radio signal transmission/reception processes and the like. The radio part 320 can receive data signals included in radio signals from the terminal 1 or the terminal 2 in the Wi-Fi system.

The radio part 320 includes an antenna 321, an RF chip 322, an AP chip 323, a memory 324, and the like. The RF chip 322 carries out reception and transmission processes including modulation and demodulation of a radio signal, via the antenna 321. The AP chip 323 carries out a specific application process on a radio signal and data, and reads and writes information from and to the memory 324. The radio part 320 stores the received radio signal data in a buffer memory. The buffer memory may be a memory in the AP chip 323 or may be a memory 324 outside the AP chip 323. The CPU 301, which is a controller, and the video processor 311 can select and read the radio signal data from the buffer memory in the radio part 320.

The memory 324 stores connection information, such as an SSID and password, as information necessary for wireless connection in the Wi-Fi system, for example. The password is indicated by PW.

For a wireless connection between a communication terminal device and the projector 3 by using the access point function 32, the radio part 320 receives connection information including an SSID and password from the communication terminal device. The radio part 320 establishes the connection to the communication terminal device when the received connection information matches connection information including an SSID and password held in the memory 324 and does not establish the connection when the received connection information does not match any connection information held in the memory 324, for example.

The projector 3 includes the wired LAN interface 330 as a component of the router function 33. The wired LAN interface 330 includes a port and a processor, and carries out layer-2 and layer-3 protocol processing and the like, connects to the communication network 5, transmits data to a device in the communication network 5, and receives data from a device in the communication network 5.

The projector 3 includes the NFC communication part 340 as a component in an embodiment including the short range communication function 34. The NFC communication part 340 is a communication interface compliant with NFC and includes an antenna coil 341, an RF circuit 342, a processing circuit 343, a memory 344, and the like. The RF circuit 342 transmits and receives a signal of short range communication in NFC, via the antenna coil 341. The processing circuit 343 carries out a specific process on a signal to be transmitted or a received signal. The processing circuit 343 reads and writes data and information from and to a memory in the processing circuit 343 or the memory 344 outside the processing circuit 343.

The projector 3 may include an operation panel and/or remote controller (not illustrated) as a user interface. The operation panel and/or remote controller is provided with various buttons and/or a display. The display displays information. A user can turn the power on and off, give an instruction for a display operation, and make settings of functions, and the like, by the use of the buttons of the operation panel and/or remote controller.

The projector 3 may provide a setting function (not illustrated) provided on the basis of a process executed by the CPU 301 or the like. The setting function displays a setting screen on the screen 313, the display of the operation panel, or the like. While viewing the setting screen, the user can, for example, input an instruction signal to the projector 3 to make settings of functions of the projector 3.

In a case where the projector 3 performs display by using the display function 31 with its connections to multiple communication terminal devices established, the projector 3 may also display display data on the screen 313 while switching to display data from a communication terminal device selected in response to a user operation. Alternatively, the projector 3 may display pieces of display data from multiple communication terminal devices on the screen 313 in parallel and display a selected piece of display data in an enlarged manner, for example.

Another embodiment has a configuration in which a communication terminal device performs control of the display operation and makes setting of the display operation for the projector 3. Specifically, the terminal 1 may be used as a device which has a function corresponding to the remote controller of the projector 3. For example, the terminal 1 transmits a signal including a command for control or setting of the display operation and the like, to the projector 3 with the connection 41 established. The projector 3, for example, controls the display operation by the display function 31 in accordance with a received signal including a command or the like. The display operation includes, for example, starting or stopping of a video.

[Communication Terminal Device]

Figure 4:
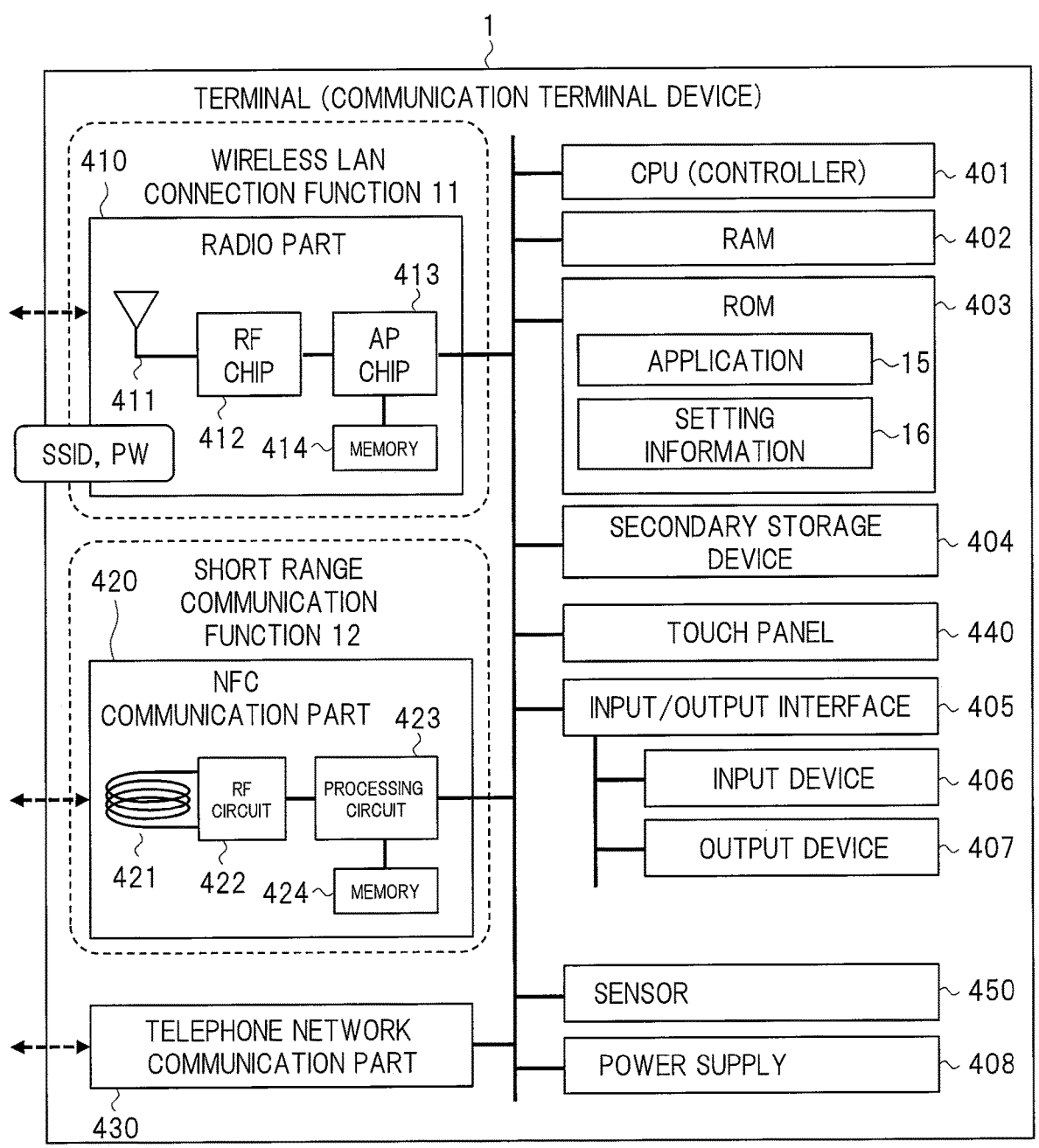
FIG. 4 is a diagram illustrating a configuration of a first terminal which is a communication terminal device of the embodiment.

FIG. 4 is a diagram illustrating a configuration of the terminal 1, which is a communication terminal device of the embodiment. Note that, although the configuration of the terminal 2 is basically the same as the configuration of the terminal 1, the terminal 1 and the terminal 2 include different components depending on the difference in role in the communication system of the present embodiment. For example, as in FIG. 5 to be described later, the terminal 1 includes a dedicated application 15, but the terminal 2 does not need to include the dedicated application 15.

The terminal 1 has a configuration in which a CPU 401, a RAM 402, a ROM 403, a secondary storage device 404, an input/output interface 405, an input device 406, an output device 407, a power supply 408, a radio part 410, an NFC communication part 420, a telephone network communication part 430, a touch panel 440, a sensor 450, and the like are connected to each other via a bus.

The CPU 401 is a controller which performs processes for controlling the entire terminal 1 including control of the connection function 11, the short range communication function 12, and the like. The RAM 402 is a memory which stores processing data and the like. The ROM 403 is a memory which stores the application 15, which is a control program, setting information 16, and the like. The CPU 401 loads the control program from the ROM 403 into the RAM 402 and executes the program to carry out each process of the functions.

The application 15 carries out a process for implementing functions unique to the terminal 1 of the present embodiment. The CPU 401 carries out software processing of the application 15. In the setting information 16, data and information for implementing the functions unique to the terminal 1 of the present embodiment are set. The setting information 16 may be stored in the secondary storage device 404, a memory in the wireless LAN communication part 410, or the like.

The secondary storage device 104 is, for example, a memory card or the like. The input/output interface 405 connects to an input device 406 and an output device 407 of various kinds and carries out input/output interface processes. The power supply 408 supplies power to each of the elements of the terminal 1. The power supply 408 turns power on or off in response to a user operation.

The terminal 1 includes the radio part 410 as a component of the connection function 11. The radio part 410 is a wireless LAN interface compliant with the Wi-Fi standards and is a module composed of an LSI or the like, which carries out radio signal transmission/reception processes and the like. The radio part 410 can receive a data signal included in a radio signal from the access point function 32 of the projector 3 in the Wi-Fi system.

The radio part 410 includes an antenna 411, an RF chip 412, an AP chip 413, a memory 414, and the like. The RF chip 412 carries out reception and transmission including modulation and demodulation of a radio signal, via the antenna 411. The AP chip 413 carries out a specific application process on a radio signal and data, and reads and writes information from and to the memory 414. The radio part 410 stores the received radio signal data in a buffer memory. The buffer memory may be a memory in the AP chip 413 or may be a memory 414 outside the AP chip 413. The CPU 401, which is a controller, and the like can select and read the radio signal data from the buffer memory in the radio part 410.

The memory 414 stores information, such as an SSID and password, as information necessary for wireless connection in the Wi-Fi system, for example.

To establish the connection 41 to the projector 3 by using the connection function 11, the terminal 1 reads connection information including an SSID and password held in the memory 414 and transmits the connection information to the projector 3, through the radio part 410.

The terminal 1 includes the NFC communication part 420 as a component of the short range communication function 12. The NFC communication part 420 is a communication interface compliant with NFC and includes an antenna coil 421, an RF circuit 422, a processing circuit 423, a memory 424, and the like. The RF circuit 422 transmits and receives a signal of short range communication in NFC, via the antenna coil 421. The processing circuit 423 carries out a specific process on a signal to be transmitted or a received signal. The processing circuit 423 reads and writes data and information from and to a memory in the processing circuit 423 or the memory 424 outside the processing circuit 423.

With NFC, non-contact data communication can be performed within a communication distance of approximately 10 cm. In short range communication in NFC, the interface of the NFC communication part of one device is, for example, waved over or brought into contact with the interface of the NFC communication part of the other device, to bring the devices closer to each other within a predetermined communication distance. This electromagnetically couples the antenna coils of the NFC communication parts of the two devices to allow data to be transmitted and received between the NFC communication parts of the two devices.

When the terminal 1 is a smartphone or the like, the terminal 1 includes the telephone network communication part 430 and carries out a communication process on a known telephone network by using the telephone network communication part 430, to enable a voice call or the like. When the terminal 1 is a smartphone or the like, the terminal 1 includes the touch panel 440. The touch panel 440 displays information on a screen and also receives a touch input operation made on the screen. When the terminal 1 is a smartphone or the like, the terminal 1 includes the sensor 450. The sensor 450 includes, as various kinds of sensors, an acceleration sensor, a gyro sensor, a GPS sensor, and the like, for example.

When the terminal 1 has a sleep function, the sleep function temporarily turns off the display of the touch panel 440 and suspends a process of the wireless LAN communication part 410, for example, which reduces the power consumption.

[Wi-Fi Connection]

Supplementary description is given of a Wi-Fi connection method for the wireless LAN 4. To establish a Wi-Fi connection between a communication terminal device and an access point, a common Wi-Fi requires information on the SSID and password of the access point. The communication terminal device collects pieces of information on SSIDs available at the spot and displays the pieces of information on the screen as candidates. The user of the communication terminal device selects an SSID corresponding to the access point to be used from among the candidate SSIDs displayed on the screen and inputs the password associated with the SSID. The communication terminal device transmits the information on the SSID and password to the access point. The access point checks the received information on the SSID and password, permits a connection from the communication terminal device when the information is the correct information matching the SSID and password of the access point, and establishes the connection. Note that the terminal 1 may store the password in the memory 414 or the secondary storage device 404 in advance, read the password from the memory 414 or the secondary storage device 404 and carry out a connection process.

The SSID stands for a service set ID and is the identifier of an access point and a wireless LAN including the access point. The password is a predetermined password necessary for a connection to the access point. Some wireless LANs do not require a password.

For example, the terminal 1 of the user A of the company A has permission to connect to the projector 3, which serves as an access point of the wireless LAN 4 communication system of the company A, and the SSID and password are given in advance to the user A. In addition, the SSID and password are not given to the user B of the company B, which prevents the terminal 2 from establishing a connection to the access point of the wireless LAN 4 communication system of the company A.

Embodiment 1

Figure 5:
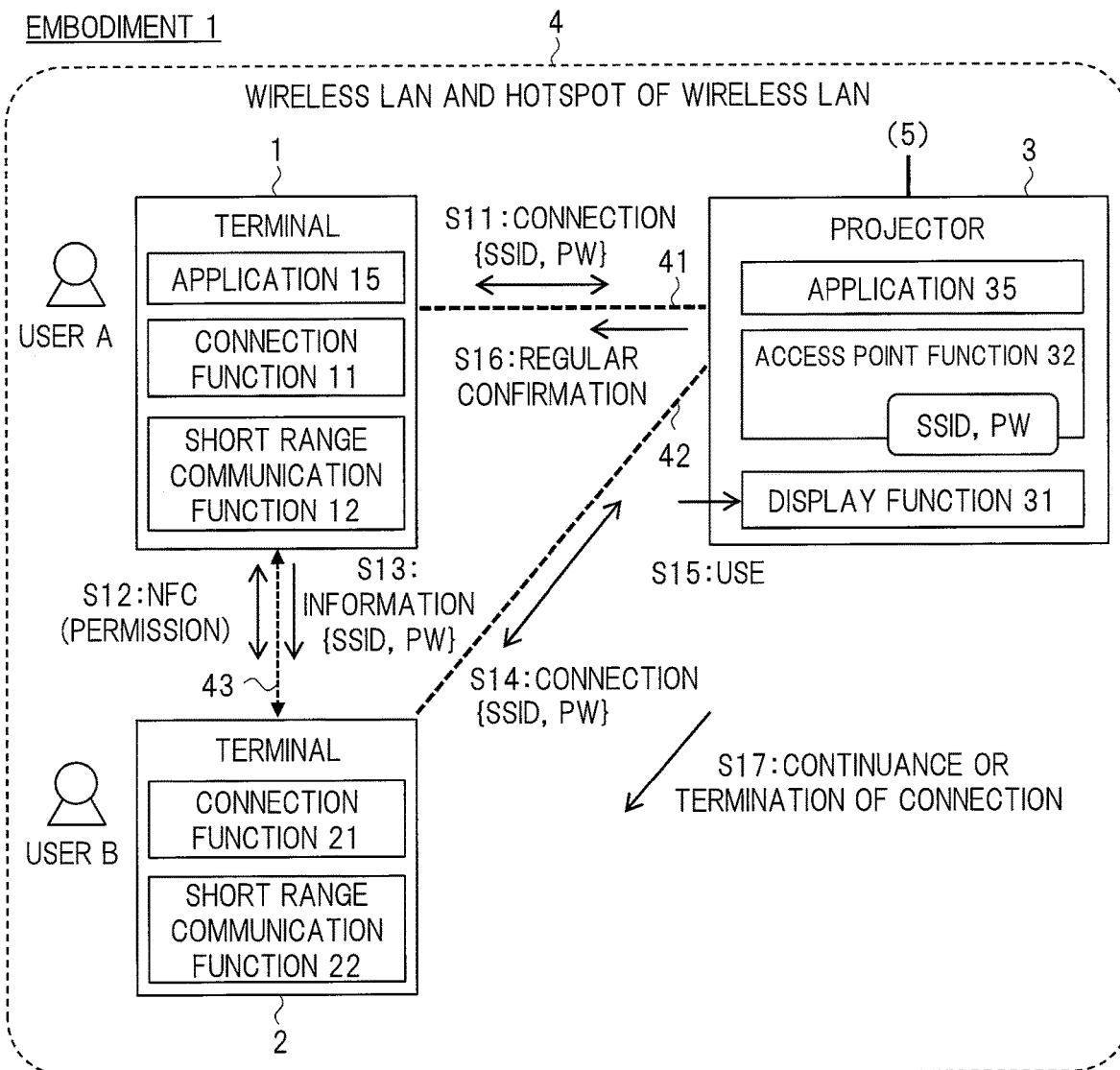
FIG. 5 is a diagram illustrating a configuration and process sequence of a communication system of Embodiment 1 of the present invention.

With reference to FIG. 5, a communication system, a communication device, and a communication terminal device of Embodiment 1 are described. FIG. 5, similar to FIG. 1, illustrates a state where the terminal 1 of the user A and the terminal 2 of the user B are located within a hotspot near the projector 3 in the wireless LAN 4. In Embodiment 1, the terminal 1 of the user A includes the application 15, but the terminal 2 of the user B does not include the application 15. In other words, as the terminal 2, any existing communication terminal device is applicable. The projector 3 includes the application 35. For each of the Wi-Fi connection 41 between the terminal 1 and the projector 3 and the Wi-Fi connection 42 between the terminal 2 and the projector 3, connection information including the SSID and password is required.

[Process Sequence]

FIG. 5 illustrates a configuration and process sequence of the communication system of Embodiment 1. S11 and the like indicate steps, such as processes and operations.

(S11) In S11, the terminal 1 of the user A establishes the connection 41 to the projector 3 within a hotspot of the wireless LAN 4. A process for establishing the connection 41 is carried out between the connection function 11 of the terminal 1 and the access point function 32 of the projector 3. In S11, the user A needs to input, by an operation or the like, preacquired connection information including the SSID and password denoted by PW on the connection 41 to the projector 3. The terminal 1 stores and holds the input connection information in the memory in the terminal 1, which makes it possible to omit the input of the connection information in S11 from the next time.

(S12) In S12, the user A starts the application 15 of the terminal 1. Note that the application 15 of the terminal 1 may be started in S11. After the start of the application 15 of the terminal 1, mechanisms such as control unique to the communication system of Embodiment 1 automatically operate.

When the user A gives the user B permission to connect the terminal 2 to and use the projector 3 with the application 15 of the terminal 1 activated, the user A establishes the connection 43 with the terminal 2 of the user B, using short range communication in NFC. As described above, the user A brings the interface of the NFC communication part 420 of the terminal 1 close to the interface of the NFC communication part 420 of the terminal 2 of the user B. A process for the connection 43 in NFC is carried out between the short range communication function 12 of the terminal 1 and the short range communication function 22 of the terminal 2.

In Embodiment 1, the operation for the short range communication in NFC between the terminal 1 and the terminal 2 in S12 corresponds to permission from the terminal 1 of the user A for the connection to and use of the projector 3 by the terminal 2 of the user B.

(S13) In S13, the terminal 1 transmits connection information including the SSID and PW for establishing a connection to the projector 3, to the terminal 2 with the connection 43 in S12 established. The terminal 2 receives the connection information through the process by the short range communication function 12 and stores the connection information in the memory in the terminal 2.

(S14) In S14, the terminal 2 establishes the Wi-Fi connection 42 to the projector 3 by the use of the connection information in S13. A process for establishing the connection 42 is carried out between the connection function 21 of the terminal 2 and the access point function 32 of the projector 3. In S14, the terminal 2 transmits the connection information including the SSID and PW to the projector 3. When the received connection information matches the connection information of the projector 3 itself, the projector 3 permits the terminal 2 to establish the connection 42.

(S15) In S15, the user B uses, through the terminal 2, the display function 31 of the projector 3 with the connection 42 established. To use the display function 31, data is transferred through the connection 42 between the connection function 21 of the terminal 2 and the access point function 32 of the projector 3. For example, the user B transmits data, such as material in the terminal 2, a display instruction, and the like to the projector 3 through the connection 42. The projector 3 causes the display function 31 to display data on the screen 313 in accordance with the data and instruction received from the terminal 2.

(S16) In S16, the application 35 of the projector 3 regularly performs communication for confirmation with the terminal 1 through the connection 41. This confirmation is for confirming whether to continue and update or terminate the permission from the terminal 1 of the user A for the terminal 2 of the user B to connect to and use the projector 3. In other words, this confirmation is for confirming whether to continue or terminate the connection 42 of the terminal 2 of the user B to the projector 3.

The communication for regular confirmation in S16 is performed at regular intervals. The regular intervals are preset with, for example, 5 minutes, 10 minutes, or 20 minutes. Alternatively, the regular intervals may be set by a setting function to be described later. The first communication for regular confirmation in S16 may be performed at the time of establishing the connection 42 in S14 or may be performed after the elapse of a certain time period from the establishment of the connection 42 in S14.

In Embodiment 1, a method in which the projector 3 makes confirmation with the terminal 1 is employed as the method for confirmation in S16. The projector 3 transmits information on a confirmation request to the terminal 1, and the terminal 1 transmits information on a confirmation response to the projector 3. When desiring to continue the permission, the terminal 1 transmits a response indicating the continuance. When desiring to terminate the permission, the terminal 1 transmits a response indicating the termination.

(S17) When the response from the terminal 1 indicates that the permission is to be continued, the projector 3 continues the connection 42 with the terminal 2 in accordance with the confirmation result in S16. When the response from the terminal 1 indicates that the permission is to be terminated, the projector 3 terminates the connection 42 with the terminal 2 in accordance with the confirmation result in S16. This brings the terminal 2 of the user B into a state where the terminal 2 is unable to connect to the projector 3 and use the display function 31.

As described above, in Embodiment 1, connection information is provided to the terminal 2 via the terminal 1 under the permission from the user A. Embodiment 1 can achieve the use as in FIG. 2 through the above-described process sequence. Note that, to give permission again from the terminal 1 of the user A for the terminal 2 of the user B to connect to and use the projector 3 after the termination of the connection of the terminal 2 of the user B in S17, a process only needs to be repeated from S11 or S12 as in the same manner as above.

Moreover, to deactivate the control in Embodiment 1, the user A terminates the application 15 of the terminal 1. Alternatively, the permission given to the terminal 2 of the user B may be automatically terminated at the time when the connection 41 between the terminal 1 of the user A and the projector 3 is terminated, so that the connection 42 between the terminal 2 and the projector 3 is terminated.

[First Confirmation Method]

In Embodiment 1, the following first confirmation method is used as the method for confirmation in S16. In the first confirmation method, for the confirmation in S16, the terminal 1 displays information for confirmation on the screen of the touch panel 440, for example, through the process by the application 15, on the basis of confirmation request information from the application 35 of the projector 3. As the information for confirmation, a message such as "Do you want to continue the permission for the terminal 2 of the user B to connect to and use the projector 3? Yes/No" is displayed on a pop-up dialog or the like, for example. The user A checks the information for confirmation displayed on the terminal 1 and performs an operation of determining, for example, whether to continue or terminate the permission for the terminal 2 of the user B to connect to and use the projector 3, and making selection accordingly. The user A presses a button indicating "Yes" or "No" with respect to the information for confirmation on the screen of the touch panel 440, for example.

According to the operation of selection through the terminal 1 by the user A, the terminal 1 transmits response information on the confirmation corresponding to the selection, to the projector 3. When the response information indicates, for example, "Yes", in other words, the selection is made so as to continue the permission, the projector 3 continues the connection 42 with the terminal 2 in S17. When the response information indicates, for example, "No", in other words, the selection is made so as to terminate the permission, the projector 3 terminates the connection 42 with the terminal 2 in S17. Note that, when the user A does not perform any selection operation through the terminal 1 and a state in which the terminal 1 does not make any response to the projector 3 continues for a predetermined time period or longer, the projector 3 may terminate the connection 42 with the terminal 2.

[Second Confirmation Method]

In a modified example of Embodiment 1, a second confirmation method described below may be used as the method for confirmation in S16. In the second confirmation method, for the confirmation in S16, the application 35 of the projector 3 transmits predetermined information for confirmation to the terminal 1 on the condition that the connection 41 in S11 has been established. When the application 15 of the terminal 1 receives the predetermined information for confirmation from the projector 3, the application 15 automatically transmits predetermined response information for confirmation. This eliminates the need for the user A to perform and hence to be aware of any operation.

When the application 35 of the projector 3 receives the predetermined response information for confirmation from the terminal 1, the application 35 can confirm, for example, that the terminal 1 and the application 15 are running and are located within the hotspot of the wireless LAN 4, and the connection 41 is continued. In other words, the projector 3 can confirm that the terminal 1 of the user A and the terminal 2 of the user B are located close to each other, for example. Hence, the projector 3 determines that the permission given to the terminal 2 of the user B by the terminal 1 of the user A is continued on the basis of this confirmation and continues the connection 42 with the terminal 2 in S17.

When having not received the predetermined response information for confirmation from the terminal 1, the application 35 of the projector 3 can determine, for example, that the terminal 1 and the application 15 have yet to be activated or are not located within the hotspot of the wireless LAN 4, or the connection 41 is not continued. The projector 3 is unable to confirm, for example, a state where the terminal 1 of the user A and the terminal 2 of the user B are located close to each other, hence determines that the permission given to the terminal 2 of the user B by the terminal 1 of the user A is to be terminated, and terminates the connection 42 with the terminal 2 in S17.

In the communication for confirmation between the projector 3 and the terminal 1 in S16 described above, a predetermined number of retries may be allowed in consideration of the possibility of communication failures.

[Control with Sleep Function]

As another modified example of Embodiment 1, control, taking into account a running state and sleep state of the terminal 1, is performed in association with the confirmation method in S16 described above. When the terminal 1 is a smartphone or the like, the terminal 1 often includes a known sleep function. Specifically, when the terminal 1 which has the sleep function has not received any input operation or the like from a user for a predetermined time period or longer in a normal state, the terminal 1 automatically changes to a sleep state, which is a low-power-consumption mode. Depending on the sleep function, the display of the touch panel 440 is turned off, and the operation of the radio part 410 is stopped, in the sleep state, for example. The terminal 1 returns from the sleep state to the normal state in response to an input operation or the like by the user.

In the sleep state, the terminal 1 may be unable to receive any communication information from the external projector 3 via the wireless LAN 4, or may be unable to process information even if the terminal 1 has received the information, for example. In this case, the terminal 1 may be unable to perform communication for confirmation with the projector 3 in S16 described above.

In view of this, in the communication system of the modified example of Embodiment 1, the following control is performed for the case of the terminal 1 including the sleep function. The terminal 1 transitions to a non-sleep state prior to S16 so as not to be in the sleep state at the time of receiving confirmation request information from the projector 3 in S16. The non-sleep state mentioned here is a state where the terminal 1 does not transition to the sleep state even when a state where terminal 1 has not received any input operation from a user continues and is capable of performing wireless communication with the external projector 3. The application 15 of the terminal 1 causes, in advance, the terminal 1 to transition to the non-sleep state after the activation of the application 15 or short range communication in S12, for example, and maintains the connection 41 in S11.

This operation allows the terminal 1 to receive confirmation request information from the projector 3 in S16 and send a response. Subsequently, the terminal 1 returns from the non-sleep state to the normal state triggered by termination of the connection 41 with the projector 3, termination of the permission given to the terminal 2 of the user B, termination of the application 15, or the like.

[Setting Function]

The application 15 of the terminal 1 or the application 35 of the projector 3 has a setting function enabling a user to make settings of the functions of Embodiment 1. For example, the user A can make settings for the contents of control of the functions of Embodiment 1 in response to a setting operation using this setting function. With the setting function, it is possible to make a time at which the regular confirmation in S16 is performed. For example, the user can set time intervals at which the regular confirmation is performed, at a desired time period, such as "5 minutes" or "10 minutes" on a setting screen provided by the application 15. Furthermore, the method for confirmation to be used in S16 may be selected from the first confirmation method and the second confirmation method by the user through the setting function.

[Effects and the Like]

The communication system of Embodiment 1 provides the function of enabling the terminal 2 of the user B of the external company B to temporarily connect to and use the projector 3 via the wireless LAN 4 of the company A, under the permission from the terminal 1 of the user A of the company A. The use of Embodiment 1 can achieve convenience through this function and ensure security in this case.

In the present embodiment, the user A and the user B can use the above-described functions through simple operations and settings. In Embodiment 1, the user A can permit the terminal 2 of the user B to connect to and use the projector 3 through simple operations of activating the application 15 of the terminal 1 and performing short range communication with the terminal 2.

Moreover, the present embodiment can ensure security in the communication system by performing control that enables the terminal 2 of the user B to temporarily connect to and use the projector 3 under the permission given on the condition that the terminal 1 of the user A and the terminal 2 of the user B are located close to each other. Particularly in Embodiment 1, when the permission is confirmed through the regular confirmation in S16, the connection 42 of the terminal 2 of the user B is continued, and the connection 42 is terminated when the permission is not confirmed. Hence, it is possible to prevent such a situation as to allow the terminal 2 of the user B of the company B to independently connect to and use the projector 3 in the communication system via the wireless LAN 4 of the company A.

First Modified Example of Embodiment 1

Figure 6:
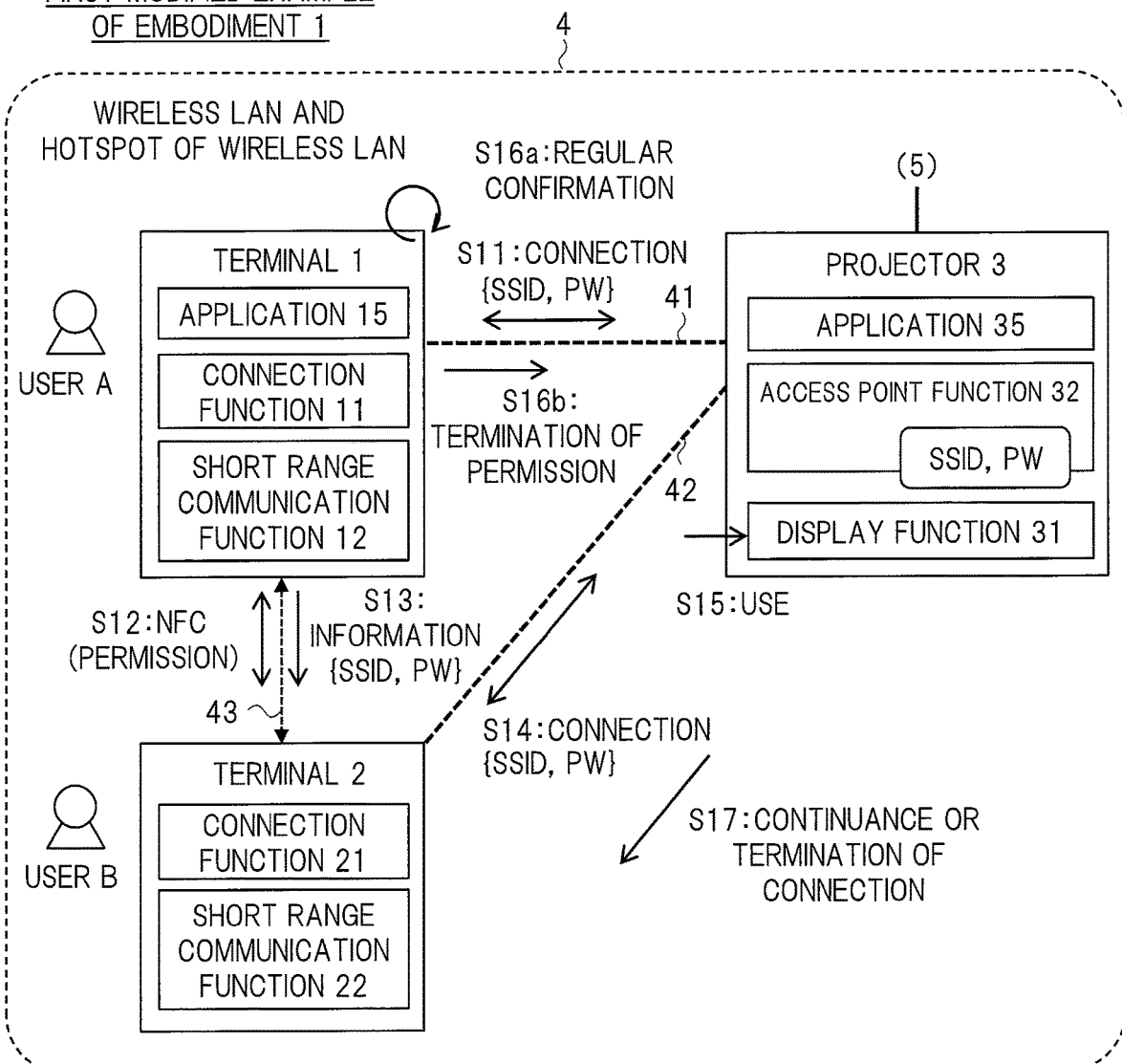
FIG. 6 is a diagram illustrating a configuration and process sequence of a communication system of a first modified example of Embodiment 1.

FIG. 6 illustrates a process sequence in a configuration of a communication system of a first modified example of Embodiment 1. The communication system of Embodiment 1 in FIG. 5 described above has a configuration in which the projector 3 plays a major role in performing the confirmation in S16. In contrast to this, the communication system of the first modified example of Embodiment 1 illustrated in FIG. 6 has a different configuration in which the terminal 1 of the user A plays a major role in performing the confirmation in S16.

In FIG. 6, steps S11 to S15 are the same as those in FIG. 5. In step S16a, the terminal 1 of the user A performs, by itself, regular confirmation regarding permission given to the terminal 2 of the user B. In the confirmation in S16a, for example, the first confirmation method, the second confirmation method, or the like can be employed as described above. In the first confirmation method, the application 15 of the terminal 1 displays information for confirmation on the screen of the terminal 1 at regular timings from the time of establishing the connection 42 of the terminal 2 in S14. The user A checks the information for confirmation on the screen and makes an input operation for selection corresponding to continuance or termination of the permission given to the terminal 2 of the user B.

When the above input from the user A indicates that the permission is to be continued, the terminal 1 does nothing, which results in no information being transmitted to the projector 3. When the above input from the user A indicates that the permission is to be terminated as in step S16b, the terminal 1 transmits information indicating termination of the permission to the projector 3. When receiving information indicating termination of the permission in S16b from the terminal 1, the projector 3 terminates the connection 42 with the terminal 2. As long as the projector 3 does not receive information indicating termination of the permission from the terminal 1, the projector 3 continues the connection 42 with the terminal 2.

Alternatively, the terminal 1 may be configured to transmit information indicating continuance of the permission to the projector 3 when the above input from the user A indicates continuance of the permission, and the projector 3 terminates the connection 42 with the terminal 2 when the projector 3 has not received information indicating continuance of the permission for a predetermined time period or longer.

Second Modified Example of Embodiment 1

Figure 7:
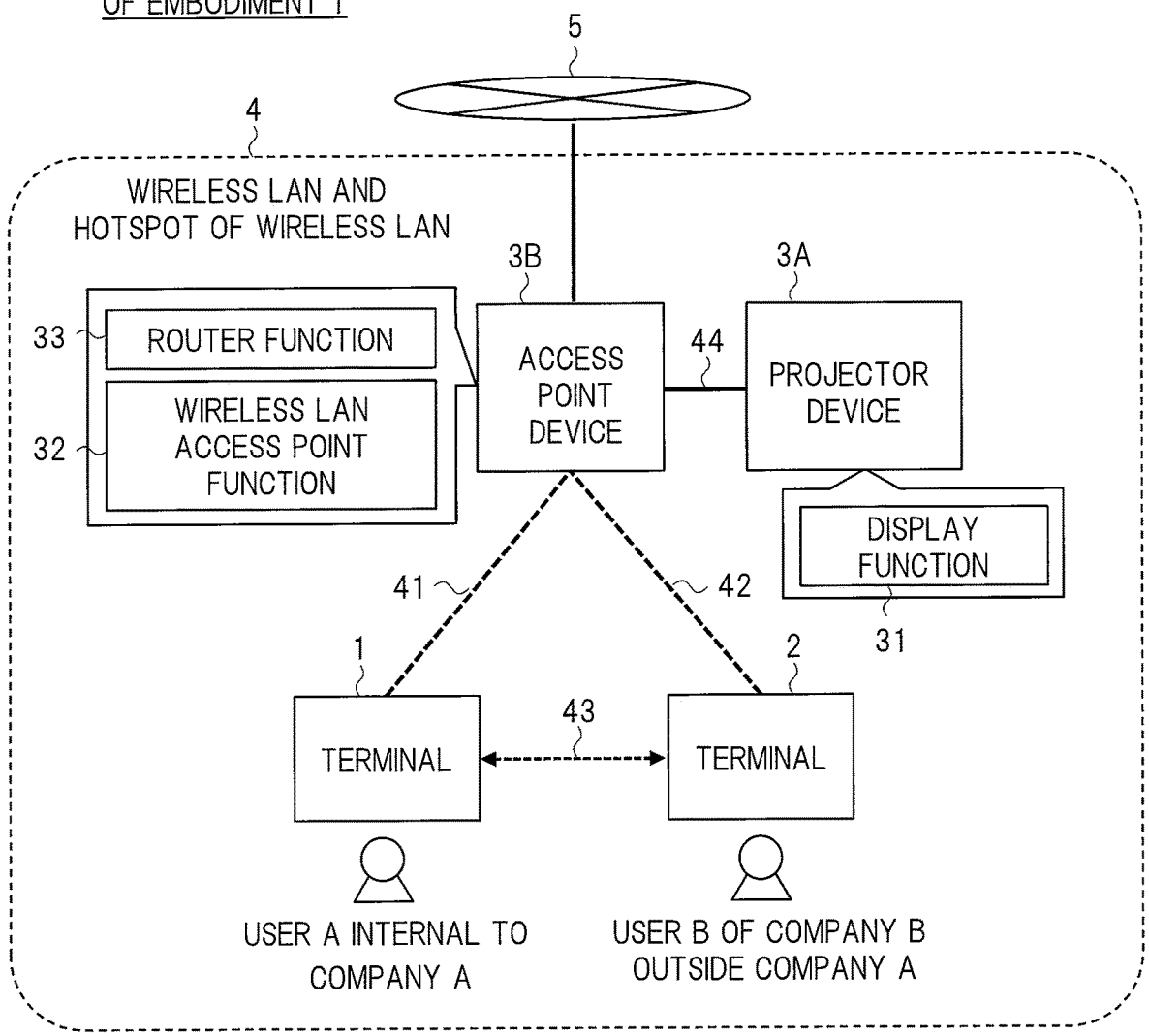
FIG. 7 is a diagram illustrating a configuration of a communication system of a second modified example of Embodiment 1.

FIG. 7 illustrates a configuration of a communication system of a second modified example of Embodiment 1. In the communication system of the second modified example of Embodiment 1 illustrated in FIG. 7, the projector 3 is constituted of two devices, instead of a single device. In the second modified example, the projector 3 of Embodiment 1 is constituted of two separate devices, in other words, a projector device 3A which has the display function 31 and an access point device 3B which has the access point function 31 of the wireless LAN 4, and the two devices coordinate with each other through communication.

The projector device 3A and the access point device 3B establish a connection 44 in a predetermined communication system and perform communication through the connection 44 for the coordination. For example, the projector device 3A and the access point device 3B include a wired LAN interface 330 as in FIG. 3 and carry out a communication process through the connection 44 via a wired LAN. The access point device 3B and the projector device 3A may include the above-described application 35.

The projector device 3A provides the display function 31, and the access point device 3B provides the access point function 31 of the wireless LAN 4 and a router function.

The terminal 1 of the user A uses the display function 31 of the projector device 3A through the connection 41 with the access point device 3B. The terminal 2 of the user B uses the display function 31 of the projector device 3A through the connection 42 with the access point device 3B, under the permission from the terminal 1 of the user A, in the same manner as above.

Embodiment 2

Figure 8:
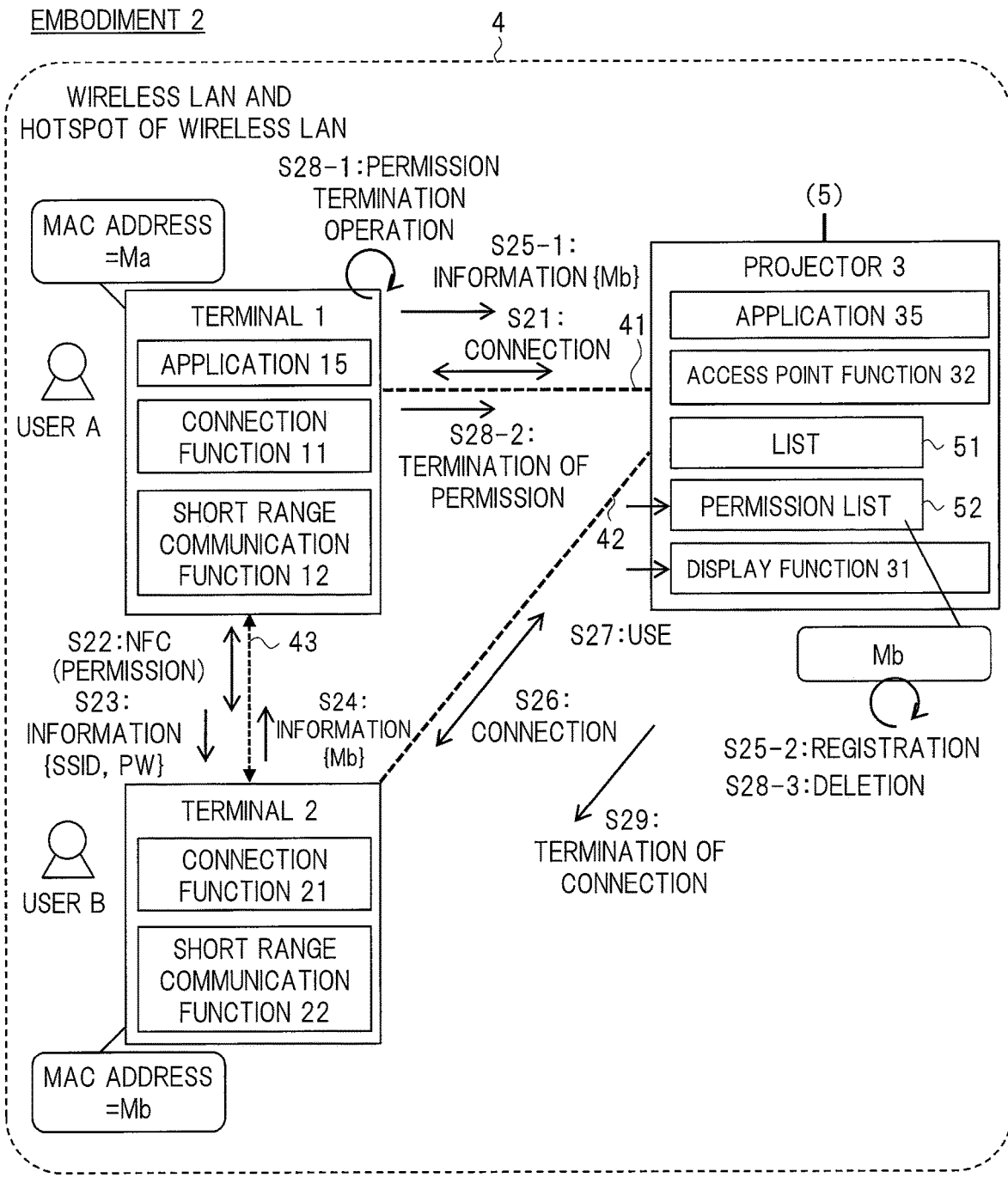
FIG. 8 is a diagram illustrating a configuration and process sequence of a communication system of Embodiment 2 of the present invention.

With reference to FIG. 8, a communication system and the like of Embodiment 2 are described. In the communication system of Embodiment 2, the projector 3 is provided with a permission list 52, in which pieces of information on terminals to be given permission for a connection to and use of the projector 3 are registered, as in FIG. 8. The projector 3 determines and controls a connection thereto and use thereof from the terminal 2 of the user B on the basis of the information in the permission list 52.

[List]

In the communication system of Embodiment 2, the projector 3 includes a list 51 and the permission list 52 as in FIG. 8. The access point function 32 manages the list 51. The access point function 32 or the application 35 manages the permission list 52.

In the list 51 as a first list, registered are pieces of information on the MAC addresses or the like of terminals of users each given permission for regular connection via the wireless LAN 4. In the example of the present embodiment, pieces of information including the MAC addresses of terminals of employees including the MAC address of the terminal 1 of the user A of the company A are registered in the list 51 in advance. Assume that the MAC address of the terminal 1 of the user A is denoted by Ma, and the MAC address of the terminal 2 of the user B is denoted by Mb.

The permission list 52 is a list provided, as a second list, for unique control in Embodiment 2. In the permission list 52, pieces of information on terminals of users each given permission for a temporary connection to and use of the projector 3 via the wireless LAN 4 under the permission from the terminal 1 of the user A are registered. In the example of the present embodiment, information including the MAC address of the terminal 2 of the user B of the company B is registered in the permission list 52.

In Embodiment 2, the terminal 1 includes the application 15. The projector 3 may include the application 35, but does not need to include the application 35. The application 15 and the application 35 carry out a process different for each embodiment.

[Process Sequence]

FIG. 8 illustrates a configuration and process sequence of the communication system of Embodiment 2. S21 and the like indicate steps. S21 to S23 are the same as S11 to S13 in Embodiment 1.

(S21) In S21, the terminal 1 of the user A and the projector 3 establish the Wi-Fi connection 41. Connection information for this connection 41 includes the SSID and password denoted by PW. In this step, the terminal 1 transmits Ma, which is its MAC address, and the projector 3 confirms whether information corresponding to the received Ma is registered in the list 51. The projector 3 does not give connection permission to a terminal that is not registered.

(S22) In S22, the user A establishes the connection 43 in NFC between the terminal 1 and the terminal 2 of the user B with the application 15 of the terminal 1 activated. This short range communication corresponds to permission from the terminal 1 of the user A for the terminal 2 of the user B to connect to and use the projector 3.

(S23) In S23, the terminal 1 transmits connection information including the SSID and password to the terminal 2 with the connection 43 established. The terminal 2 receives the connection information and stores the connection information in the memory.

(S24) Moreover, in S24, the terminal 1 acquires information on Mb, which is the MAC address of the terminal 2, from the terminal 2 through the connection 43. The terminal 1 stores the information on Mb in the memory.

(S25-1) In S25-1, the terminal 1 transmits information including Mb, which is the MAC address of the terminal 2, to the projector 3 through the connection 41.

(S25-2) In S25-2, the projector 3 registers the information including Mb, which is the MAC address of the terminal 2, received from the terminal 1 so as to add the information to the permission list 52. The state in which the MAC address is registered corresponds to the state of having control for permitting the connection 42 between the terminal 2 and the projector 3. In this step, the projector 3 registers, in the permission list 52, only a MAC address transmitted from a terminal registered in the list 51.

(S26) In S26, the terminal 2 establishes the Wi-Fi connection 42 with the projector 3 by the use of the SSID and password, which are the connection information in S23. In S26, the projector 3 refers to the information in the permission list 52 and confirms whether or not the MAC address of a terminal to be connected is registered. In this step, Mb, which is the MAC address of the terminal 2, is already registered in the permission list 52 in S25-2. Hence, the projector 3 permits the terminal 2 to establish the connection 42 in S26. The projector 3 does not permit a terminal whose MAC address is not registered in the permission list 52 to establish the connection 42.

(S27) In S27, the terminal 2 uses the display function 31 of the projector 3 through the connection 42.

(S28-1) In S28-1, the user A confirms whether to continue or terminate the permission for the terminal 2 of the user B to connect to and use the projector 3. The user A does not make any changes when the permission is to be continued. When the permission is to be terminated in S28-1, in other words, when the connection 42 is to be terminated, the user A performs an input operation corresponding to the termination of the permission given to the terminal 2 of the user B, in other words, termination of the connection 42, on the screen provided by the application 15 of the terminal 1.

(S28-2) In S28-2, the application 15 of the terminal 1 transmits information indicating the termination of the permission given to the terminal 2 of the user B to the projector 3 through the connection 41 in response to the input operation for the termination of the permission in S28-1.

(S28-3) In S28-3, when the projector 3 receives the information indicating the termination of the permission given to the terminal 2 of the user B from the terminal 1, the projector 3 deletes the information on Mb, which is the MAC address of the terminal 2, from the permission list 52. This state in which the registration of the MAC address is deleted corresponds to the state of having control for not permitting the connection 42 between the terminal 2 and the projector 3.

(S29) In S29, as a result of the registration of the MAC address of the terminal 2 being deleted from the permission list 52 in S28-3, the projector 3 terminates the connection 42 with the terminal 2. This operation brings the terminal 2 of the user B into a state where the terminal 2 is unable to establish the connection 42 with the projector 3 and use the display function 31.

As described above, in Embodiment 2, the connection to and use of the projector 3 by the terminal 2 of the user B is controlled in accordance with confirmation of the MAC address obtained from the terminal 2 of the user B via the terminal 1 of the user A.

[Termination Upon Power-Off]

As a modified example of Embodiment 2, the following method can also be employed for the process of terminating the connection 42 of the terminal 2 of the user B through registration, deletion, and confirmation of information in the above permission list 52. Specifically, the projector 3 deletes the information on the MAC address of the terminal 2 registered in the permission list 52 in an operation termination process upon power-off through an operation made by the user A or the like. Alternatively, the projector 3 initializes the permission list 52 at the time of power-off to delete all the pieces of information. After the deletion, the projector 3 does not permit the connection 42 of the terminal 2 whose MAC address has yet to be registered in the permission list 52 after power-on.

As a modified example of Embodiment 2, the following method for confirmation and termination can also be employed. Specifically, in this method, the projector 3 performs regular confirmation with the terminal 1 as in S16 in Embodiment 1, instead of the steps indicated in S28-1 to S28-3 and the like. When the permission is to be terminated as a result of the regular confirmation, the projector 3 deletes the information on the MAC address of the terminal 2 from the permission list 52 and terminates the connection 42 with the terminal 2.

As a modified example of Embodiment 2, the projector 3 may hold a list including a combination of the list 51 and the permission list 52. Specifically, in this list, information on the terminals each given permission for a connection, including the MAC address of the terminal 1 of the user A and the like each given permission for a regular connection and the MAC address of the terminal 2 of the user B and the like each given permission for a temporary connection is registered and managed.

Modified Example of Embodiment 2

Figure 9:
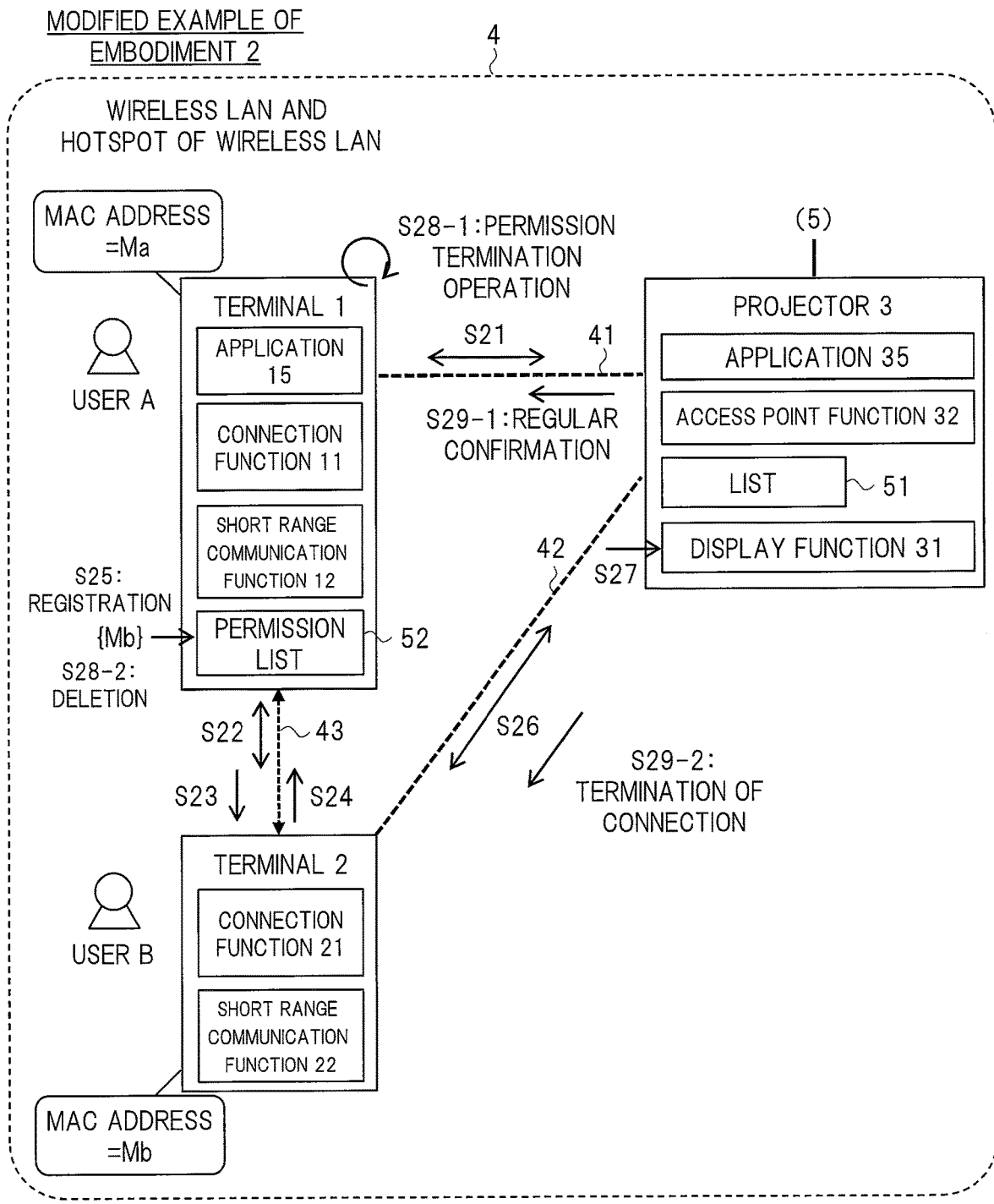
FIG. 9 is a diagram illustrating a configuration and process sequence of a communication system of a modified example of Embodiment 2.

FIG. 9 illustrates a configuration and process sequence in a communication system of a modified example of Embodiment 2. In the communication system of this modified example, the terminal 1 of the user A, instead of the projector 3, holds the permission list 52. The application 15 manages the permission list 52. The projector 3 holds the list 51. S21 to S24 in FIG. 9 are the same as S21 to S24 in FIG. 8.

In S25 in FIG. 9, the application 15 of the terminal 1 registers information on Mb, which is the MAC address of the terminal 2 to be permitted, in the permission list 52. In S26, the terminal 2 establishes the connection 42 with the projector 3. In S27, the terminal 2 uses the display function 31 of the projector 3 through the connection 42.

In S28-1, when terminating permission for the terminal 2 of the user B to connect to and use the projector 3, the user A performs an input operation for terminating the permission on the screen provided by the application 15 of the terminal 1. In S28-2, in response to the operation in S28-1, the application 15 of the terminal 1 deletes the information on Mb, which is the MAC address of the terminal 2 whose permission is to be terminated, from the permission list 52.

In contrast, the projector 3 performs regular confirmation with the terminal 1 as to whether to continue or terminate the permission for the terminal 2 of the user B to connect to and use the projector 3. In S29-1, the projector 3 transmits information on regular confirmation to the terminal 1 through the connection 41. The terminal 1 transmits response information for the regular confirmation to the projector 3 on the basis of the state of the permission list 52. In S29-1, for example, the projector 3 refers to the information in the permission list 52 in the terminal 1 and confirms whether or not the MAC address of the terminal 2 is registered in the permission list 52. When the MAC address of the terminal 2 is registered in the permission list 52, the projector 3 continues the connection 42 with the terminal 2. When the MAC address is not registered, the projector 3 terminates the connection 42 with the terminal 2.

The communication for the regular confirmation in S29-1 is performed at regular intervals as in S16 in Embodiment 1. Note that the first communication for the regular confirmation in S29-1 is performed at the time of establishing the connection 42 in S26. In this step, control using the sleep function may be performed in the terminal 1 as described above.

The regular confirmation in S29-1 described above may be performed in such a way as to notify, from the terminal 1, the projector 3 of information on the contents in the permission list 52 in a push-type manner. For example, the terminal 1 may instruct the projector 3 to terminate the permission for the terminal 2 to connect to and use the projector 3, in other words, to terminate the connection 42, immediately after the deletion of the information on the MAC address of the terminal 2 from the permission list 52 in S28-2. The projector 3 terminates the connection 42 with the terminal 2 in accordance with the instruction.

Embodiment 3

Figure 10:
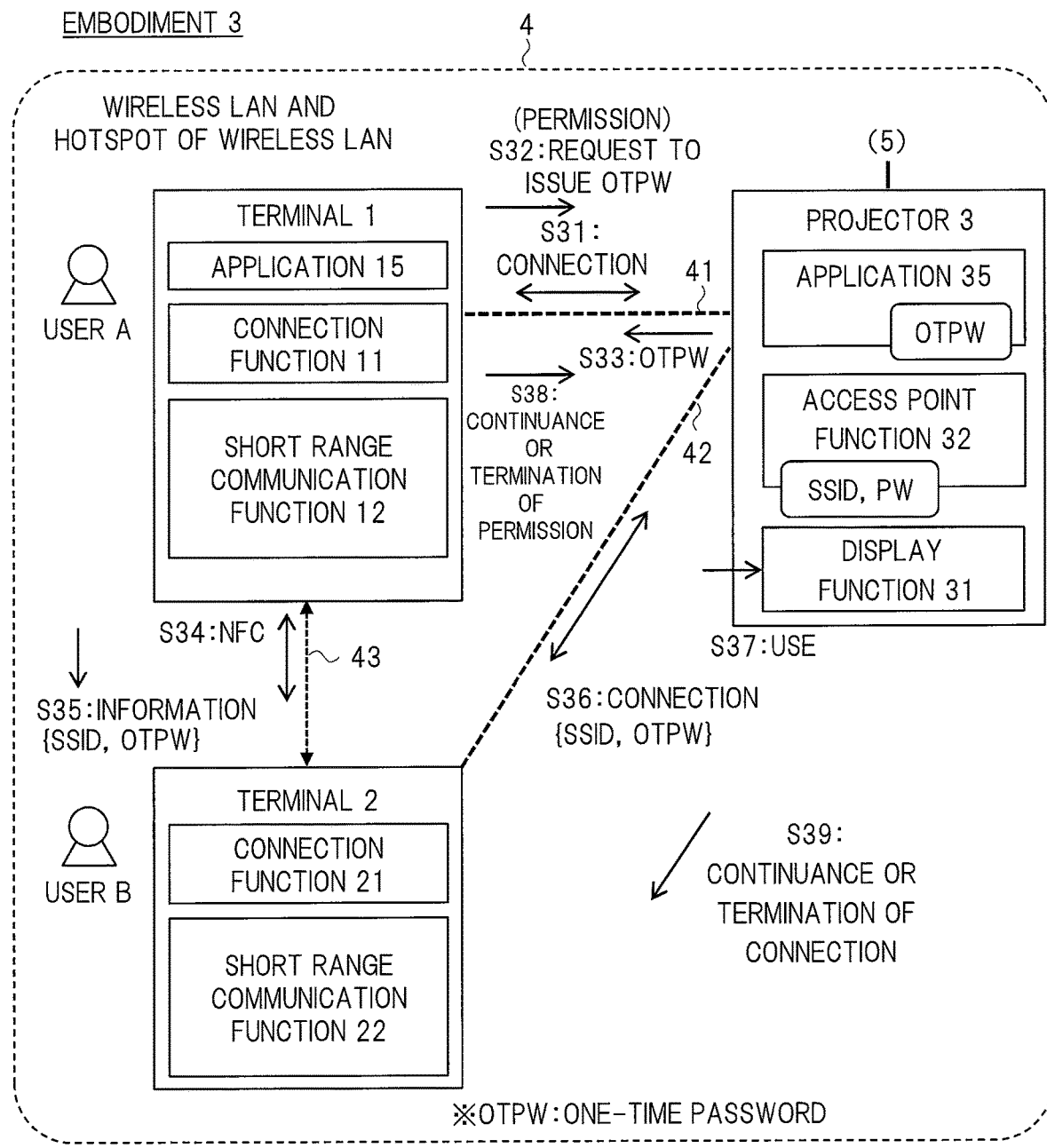
FIG. 10 is a diagram illustrating a configuration and process sequence of a communication system of Embodiment 3 of the present invention.

With reference to FIG. 10, a communication system and the like of Embodiment 3 are described. In Embodiment 3, a one-time password is issued for control of permission for the terminal 2 of the user B to connect to and use the projector 3. This one-time password is information prepared for control unique to Embodiment 3 and different from the above-described password associated with an SSID.

[Process Sequence]

FIG. 10 illustrates a configuration and process sequence of the communication system of Embodiment 3. S31 and the like indicate steps.

(S31) In S31, the terminal 1 of the user A establishes the Wi-Fi connection 41 with the projector 3 as in the same manner as above and stores the SSID and password denoted by PW, which are connection information.

(S32) In S32, when permitting the terminal 2 of the user B to connect to and use the projector 3, the user A requests, through the terminal 1, the projector 3 to issue a one-time password for the permission. The one-time password is denoted by OTPW. In S32, for example, the user A performs an input operation for the permission on the screen provided by the application 15 of the terminal 1, thereby causing the application 15 of the terminal 1 to transmit information on the issue request of a one-time password to the projector 3 through the connection 41.

(S33) In S33, upon receipt of the information on the issue request of a one-time password in S32, the projector 3 causes the application 35 to issue a one-time password and transmits the one-time password to the terminal 1 through the connection 41. The terminal 1 receives the one-time password from the projector 3 and stores the one-time password in the memory. Alternatively, the access point function 32 may issue a one-time password.

In a configuration where the projector 3 includes the short range communication function 34, the terminal 1 may transmit, to the projector 3, information on the issue request of a one-time password in S32 described above, through short range communication with the projector 3 in the communication in S32, and the terminal 1 may receive the one-time password from the projector 3 through short range communication with the projector 3 in the communication in S33.

(S34) In S34, the terminal 1 establishes the connection 43 with the terminal 2 in NFC.

(S35) In S35, the terminal 1 transmits connection information including the SSID in S31 described above and the one-time password denoted by OTPW and acquired in S33, to the terminal 2 through the connection 43. The terminal 2 stores the received connection information including the SSID and one-time password in the memory.

(S36) In S36, the terminal 2 establishes the Wi-Fi connection 42 with the projector 3 by the use of the SSID and one-time password, which are the connection information acquired in S35. In S36, the terminal 2 transmits the one-time password to the projector 3. The application 35 of the projector 3 confirms whether the one-time password received from the terminal 2 matches the one-time password issued in S33. The application 35 of the projector 3 permits the connection 42 with the terminal 2 when the one-time passwords match each other, whereas the application 35 does not permit the connection 42 with the terminal 2 when the one-time passwords do not match each other.

(S37) In S37, the terminal 2 uses the display function 31 of the projector 3 through the connection 42.

(S38) In S38, the user A confirms whether to continue or terminate the permission for the terminal 2 of the user B to connect to and use the projector 3, and the terminal 1 transmits information indicating the continuance or termination of the permission to the projector 3. For example, when terminating the permission, the user A performs, as in the same manner as above, an input operation for terminating the permission on the screen provided by the application 15 of the terminal 1. This operation causes the application 15 of the terminal 1 to transmit information indicating the termination of the permission to the projector 3.

(S39) In S39, the projector 3 continues or terminates the connection 42 with the terminal 2 in accordance with the information on the confirmation and instruction regarding whether to continue or terminate the permission, from the terminal 1 in S38.

Alternatively, for example, the projector 3 may keep the issued one-time password valid in accordance with the information indicating continuance of the permission from the terminal 1 and make the issued one-time password invalid in accordance with the information indicating termination of the permission.

Alternatively, for example, the projector 3 may issue a new one-time password as an update process in accordance with information indicating continuance of the permission from the terminal 1 and may discard the issued one-time password in accordance with the information indicating termination of the permission.

The processes in S38 and S39 described above may be configured to cause the projector 3 to make regular confirmation with the terminal 1 as in the same manner as above.

As described above, in Embodiment 3, the connection to and use of the projector 3 by the terminal 2 of the user B is controlled in accordance with confirmation of the one-time password provided to the terminal 2 of the user B via the terminal 1 of the user A.

Thereafter, the projector 3 or the terminal 1 discards or invalidates the above issued one-time password upon power-off of the projector 3, the elapse of a predetermined time period, or the like.

Embodiment 4

Figure 11:
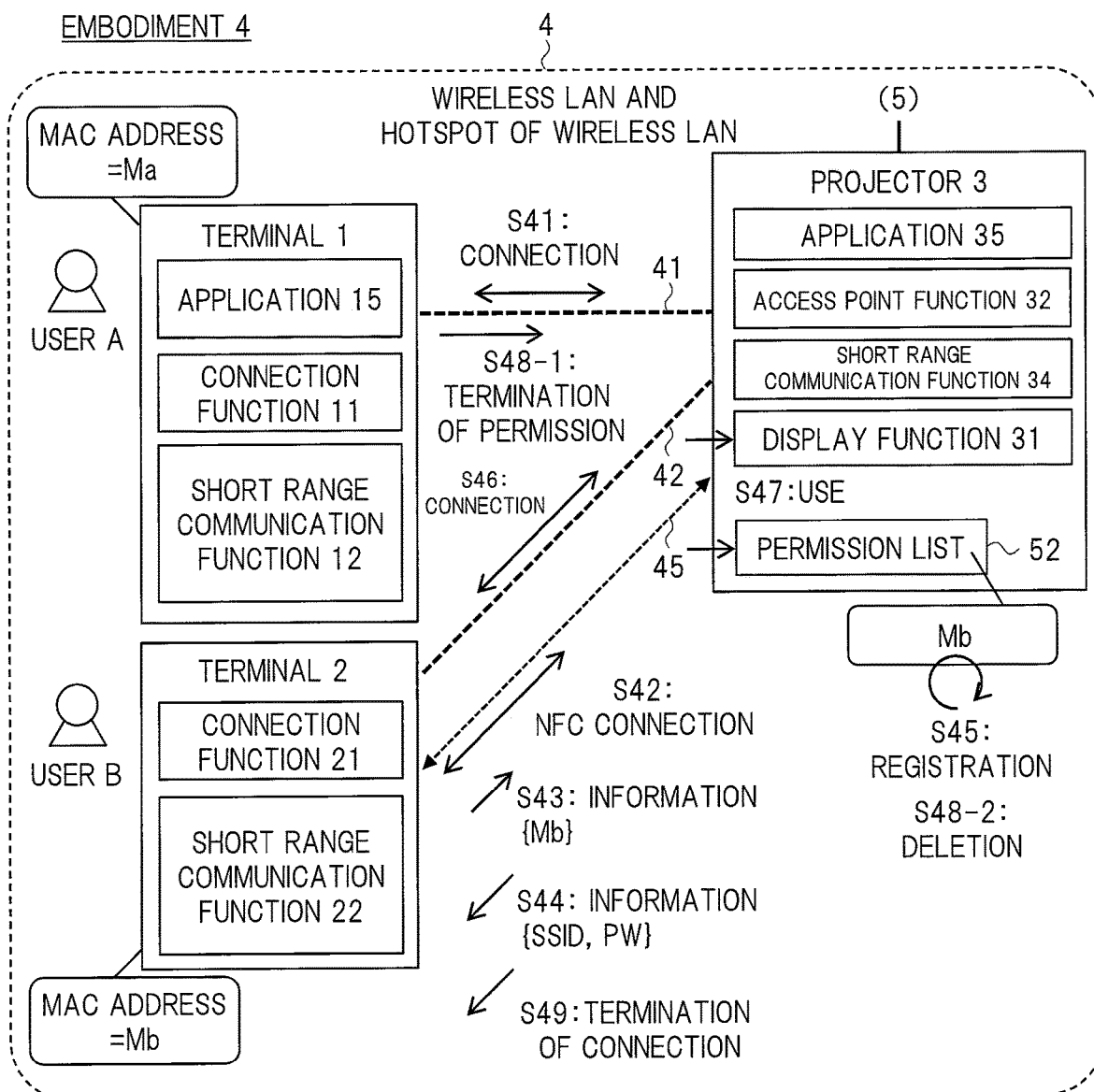
FIG. 11 is a diagram illustrating a configuration and process sequence of a communication system of Embodiment 4 of the present invention.

With reference to FIG. 11, a communication system and the like of Embodiment 4 are described. In Embodiment 4, control is performed by registering information on the MAC address of the terminal 2 in the permission list 52 of the projector 3, as in Embodiment 2. In Embodiment 4, short range communication with the terminal 2 of the user B is performed by the use of the short range communication function 34 of the projector 3. The projector 3 of Embodiment 4 includes the above-described short range communication function 43.

[Process Sequence]

FIG. 11 illustrates a configuration and process sequence of the communication system of Embodiment 4. S41 and the like indicate steps.

(S41) In S41, the terminal 1 and the projector 3 establish the Wi-Fi connection 41.

(S42) In S42, when permitting the terminal 2 of the user B to connect to and use the projector 3, the user A causes the terminal 2 of the user B to perform short range communication with the projector 3. In FIG. 11, 45 denotes a connection using short range communication in NFC between the short range communication function 22 of the terminal 2 and the short range communication function 34 of the projector 3. For example, the user B brings the interface of the short range communication function 22 of the terminal 2 close to the interface of the short range communication function 34 of the projector 3. This operation establishes the connection 45 in NFC.

(S43) In S43, the projector 3 acquires information on Mb, which is the MAC address of the terminal 2, from the terminal 2 with the connection 45 in S42 established.

(S44) In S44, the access point function 32 or the application 35 of the projector 3 transmits connection information including the SSID and password denoted by PW for the connection via the wireless LAN 4, to the terminal 2 with the connection 45 in S42 established. The terminal 2 receives the connection information and stores the connection information in the memory. In S44, the projector 3 may communicate with the terminal 1 to confirm if the projector 3 may transmit the connection information to the terminal 2.

(S45) In S45, the projector 3 registers the information including Mb, which is the MAC address of the terminal 2, acquired in S43, in the permission list 52. Note that the projector 3 holds the list 51 and the permission list 52 in the same manner as above.

(S46) In S46, the terminal 2 establishes the Wi-Fi connection 42 with the projector 3 by the use of the connection information including the SSID and PW in S43.

(S47) In S47, the terminal 2 uses the display function 31 of the projector 3 through the connection 42.

(S48-1) In S48-1, when terminating the permission for the terminal 2 of the user B to connect to and use the projector 3, the user A performs an input operation for terminating the permission on the screen provided by the application 15 of the terminal 1 in the same manner as above. This operation causes the application 15 of the terminal 1 to transmit information indicating the termination of the permission to the projector 3.

(S48-2) In S48-2, in accordance with the information indicating the termination of the permission transmitted from the terminal 1, the projector 3 deletes the information on Mb, which is the MAC address of the terminal 2, from the permission list 52.

(S49) In S49, as a result of the MAC address of the terminal 2 being deleted from the permission list 52 in S47-2, the projector 3 terminates the connection 42 with the terminal 2, which makes the terminal 2 of the user B unable to connect to and use the projector 3.

The process for confirmation in S48-1 and S48-2 described above may be configured to cause the projector 3 to make regular confirmation with the terminal 1 in the same manner as above. In this step, control using the sleep function may be performed in the terminal 1 as described above.

Subsequently, the projector 3 may delete the information on the MAC address of the terminal 2 registered in the permission list 52 upon power-off or the like in the same manner as above.

Note that, although short range communication is not performed between the terminal 1 and the terminal 2 in Embodiment 4, predetermined information for control may be transmitted and received between the terminal 1 and the terminal 2 using short range communication as a modified example of Embodiment 4.

Embodiment 5

Figure 12:
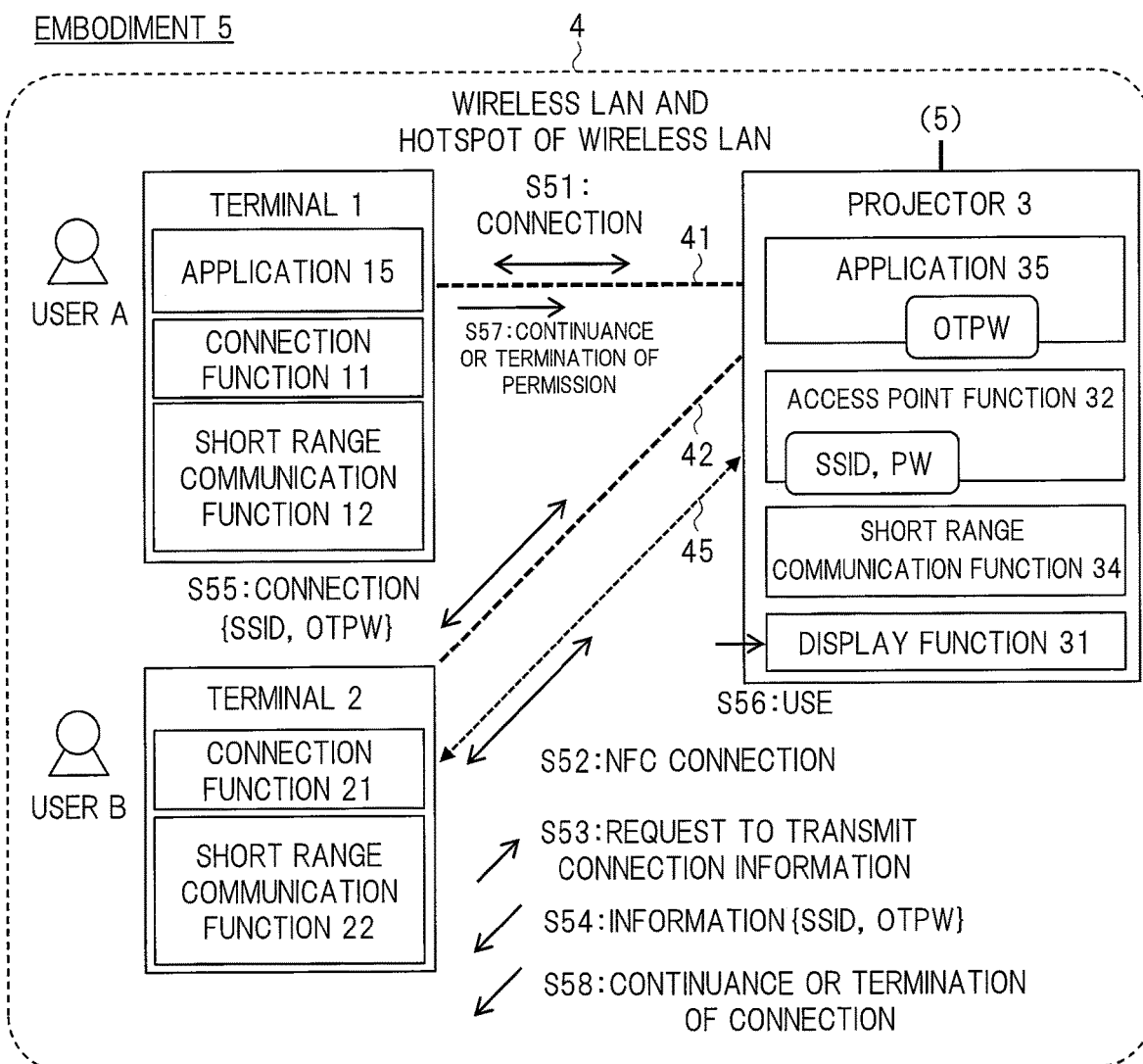
FIG. 12 is a diagram illustrating a configuration and process sequence of a communication system of Embodiment 5 of the present invention.

With reference to FIG. 12, a communication system and the like of Embodiment 5 are described. Embodiment 5 has a configuration in which a one-time password for control is used, as a configuration common to Embodiment 3 and has a configuration in which short range communication is performed between the terminal 2 of the user B and the projector 3 as a configuration common to Embodiment 4.

[Process Sequence]

FIG. 12 illustrates a configuration and process sequence of the communication system of Embodiment 5. S51 and the like indicate steps.

(S51) In S51, the terminal 1 establishes the Wi-Fi connection 41 with the projector 3.

(S52) In S52, the terminal 2 of the user B is caused to perform short range communication with the projector 3. The terminal 2 of the user B establishes the connection 45 in NFC with the projector 3.

(S53) In S53, the terminal 2 transmits, to the projector 3, information on an issue request of a one-time password denoted by OTPW regarding permission for a connection via the wireless LAN 4, with the connection 45 in S52 established.

(S54) In S54, in response to the issue request in S53, the application 35 of the projector 3 issues a one-time password. The access point function 32 of the projector 3 transmits connection information including the SSID and one-time password for the connection via the wireless LAN 4, to the terminal 2 through the connection 45.

Note that, in this step, the projector 3 may communicate with the terminal 1 to confirm if the projector 3 may transmit the connection information including the one-time password to the terminal 2.

(S55) In S55, the terminal 2 establishes the Wi-Fi connection 42 with the projector 3 by the use of the above-mentioned connection information including the SSID and one-time password. The projector 3 confirms the one-time password in the same manner as above and then permits the connection 42.

(S56) In S56, the terminal 2 uses the display function 31 of the projector 3 through the connection 42.

(S57) In S57, the user A confirms whether to continue or terminate the permission for the terminal 2 of the user B to connect to and use the projector 3. For example, when terminating the permission, the user A performs an input operation for terminating the permission on the screen provided by the application 15 of the terminal 1 in the same manner as above. This operation causes the application 15 of the terminal 1 to transmit information indicating the termination of the permission to the projector 3.

(S58) In S58, the projector 3 continues or terminates the connection 42 with the terminal 2 in accordance with the information in S57. In this step, the one-time password issued in S54 is made invalid.

S57 and S58 described above may be configured so that the projector 3 makes regular confirmation with the terminal 1 in the same manner as above. In this step, control using the sleep function may be performed in the terminal 1 as described above.

Embodiment 6

With reference to FIG. 13, a communication system and the like of Embodiment 6 are described. Other communication systems than NFC can be employed as a short range communication system between the terminal 1 and the terminal 2 and as a short range communication system between each communication terminal device and the projector 3 in Embodiment 1 and the like described above. Embodiment 6 is a configuration in which bar code recognition system using a camera is employed, as a short range communication system between the terminal 1 and the terminal 2.

In Embodiment 6, the terminal 2 includes a camera. The terminal 2 has a camera control function as the short range communication function 22. The short range communication function 22 carries out a process of reading information obtained by capturing an image by the use of the camera, and the like. As the camera and the control function of the terminal 2, a camera included in an existing smartphone or the like and the function of controlling the camera can be employed.

[Process Sequence]

FIG. 13 illustrates a configuration and process sequence of the communication system of Embodiment 6. S61 and the like indicate steps.

(S61) In S61, the terminal 1 establishes the Wi-Fi connection 41 with the projector 3.

(S62) In S62, when permitting the terminal 2 of the user B to connect to and use the projector 3, the user A performs an operation for displaying connection information by the use of the application 15 of the terminal 1. The application 15 of the terminal 1 carries out a process of converting the connection information including the SSID and password for the wireless LAN 4 through the connection 41 in S61, into the data of, for example, a two-dimensional bar code and displaying the data on the screen provided by the application 15 of the terminal 1.

(S63) In S63, the user B performs, as short range communication between the terminal 1 and the terminal 2, an operation for recognizing the bar code on the screen provided by the application 15 of the terminal 1, by the use of the camera of the terminal 2. The terminal 2 reads the bar code from the image captured by the camera and acquires connection information including the SSID and password by converting the read bar code. The terminal 2 stores the acquired connection information in the memory.

The subsequent steps are mostly the same as those in the above-described embodiments. In S64, the terminal 2 establishes the Wi-Fi connection 42 with the projector 3 by the use of the connection information in S63. In S65, the terminal 2 uses the display function 31 of the projector 3 through the connection 42. In S66, confirmation whether to continue or terminate the permission is performed between the terminal 1 and the projector 3 in a predetermined method in the same manner as above. On the basis of the confirmation, the projector 3 continues or terminates the connection 42 with the terminal 2 in S67.

Note that, in a case where the terminal 2 does not have the function of controlling a process for reading connection information with the camera in Embodiment 6, a dedicated application which has such a function may be temporarily installed.

Modified Example of Embodiment 6

As a modified example of Embodiment 6, a configuration may be made so that short range communication using a camera is performed between the terminal 2 of the user B and the projector 3. In this modified example, connection information is displayed on a screen of the projector 3 instead of displaying the connection information on the screen provided by the application 15 of the terminal 1. The projector 3 converts the connection information into, for example, a bar code, through a process by the application 35 and displays the converted information on the display of a screen 313, an operation panel, or the like.

The terminal 2 acquires the connection information by capturing, with the camera, an image of the bar code on the screen displayed by the projector 3 and reading the bar code. The subsequent steps are substantially the same as those described above. The terminal 2 establishes the connection 42 with the projector 3 by the use of the connection information and uses the display function 31. The projector 3 continues or terminates the connection 42 with the terminal 2 in response to the confirmation as to whether to continue or terminate the permission between the terminal 1 and the projector 3.

[Effects and the Like]

As described above, the communication system of each embodiment provides the function of enabling the terminal 2 of the extra-company user B to temporarily connect to and use the projector 3 via the wireless LAN 4 under permission from the terminal 1 of the intra-company user A. Each embodiment can achieve convenience through this function and ensure security in such a case.

The technology of the embodiments is a mechanism for the terminal 1 of the user A to permit the terminal 2 of the user B to connect to and use the projector 3, in a situation where the intra-company user A and the extra-company user B are located close to each other and the user A knows the existence of the user B. With the mechanism including permission based on the situation and confirmation as to whether to continue or terminate the permission, security is ensured. In addition, control including this permission does not require many operations, such as setting, and can be easily used only by an operation of an application, an operation for short range communication, and the like.

The present invention has been described in details on the basis of the embodiments. However, the present invention is not limited to the above-described embodiments, and various changes can be made without departing from the gist of the present invention. As other embodiments, a configuration made by combining functions and elements of each of the above-described embodiments and a configuration made by omitting some of the functions and elements of each embodiment are possible.

In a communication system of another embodiment, information for confirmation may be displayed on the screen for the projector 3 instead of the screen provided by the application 15 of the terminal 1 when an input operation for continuing or terminating permission is performed by the terminal 1 of the user A, as in, for example, S28-1 in FIG. 8 described above. For example, the projector 3 displays information on confirmation as to continue or terminate the permission for the terminal 2 of the user B to connect to and use the projector 3, in the display on the screen 313 through the process by the application 35. The displayed information provides options such as "yes/no" or "continue/terminate", for example.

The user A checks the information for confirmation displayed on the screen of the projector 3 and inputs instruction information to the projector 3. For example, the terminal 1 may be used as a device having a function corresponding to a remote controller of the projector 3, by the application 15. The user A inputs an instruction on the screen provided by the application 15 of the terminal 1. This operation causes the terminal 1 to transmit the instruction information to the projector 3 through the connection 41. The projector 3 receives the instruction information from the terminal 1 and performs a process for, for example, continuing or terminating the connection, in accordance with the instruction.

A communication system of another embodiment is implemented with multiple functions and methods of the above-described multiple embodiments, to allow the user to select a function and method to use through a setting function. For example, the user A selects and sets the method of Embodiment 1 from among multiple methods displayed as options in a setting window, through the setting function provided by the application 15 of the terminal 1 or the application 35 of the projector 3. With this setting made, control as in FIG. 5 of Embodiment 1 is employed.

In each embodiment, not only does the terminal 1 include the dedicated application 15, but also the terminal 2 may include a dedicated application for unique control. In this case, the application 15 of the terminal 1 and the application of the terminal 2 coordinate with each other.

INDUSTRIAL APPLICABILITY

The present invention is applicable to a display device, a wireless LAN, a system for assisting in meetings and conferences, and the like.

REFERENCE SIGNS LIST

1 Terminal
2 Terminal
3 Projector
4 Wireless LAN
5 Communication network
11, 21 Connection function
12, 22, 34 Short range communication function
15 Application
31 Display function
32 Access point function
33 Router function
35 Application
41, 42, 43, 44, 45 Connection

The invention claimed is:

1. A communication system comprising:
   a communication device;
   an access point device;
   a first communication terminal configured to connect to the communication device via the access point device and transmit a command to remotely control a display operation on the communication device connected with the first communication terminal; and
   a second communication terminal configured to, if having permission from the first communication terminal, establish a connection with the communication device to use the communication device;
   wherein, while the communication device outputs data received from the second communication terminal that has established the connection with the communication device and upon receiving, by the communication device, the command from the first communication terminal, the communication device is configured to control how to display the data received from the second communication terminal while maintaining the connection with the second communication terminal, and
   wherein, when the communication device receives information to terminate the permission from the first communication terminal, the communication device is configured to terminate the connection with the second communication terminal in accordance with the information to terminate permission received from the first communication terminal.

2. The communication system according to claim 1, wherein,
   for the permission, the first communication terminal transmits, to the second communication terminal, connection information necessary for a connection through short range communication with the second communication terminal, and the second communication terminal connects to the communication device by using the connection information.

3. The communication system according to claim 1, wherein,
   the communication device performing communication with the first communication terminal at predetermined time intervals for confirming whether to continue or terminate the permission for the second communication terminal to connect to the communication device, after the connection to the second communication terminal, and continuing the connection with the second communication terminal upon confirming the permission is to be continued, while terminating the connection with the second communication terminal upon confirming the permission is to be terminated.

4. The communication system according to claim 1, wherein,
   the first communication terminal confirming, with a user at the predetermined time intervals, whether to continue or terminate the permission for the second communication terminal to connect to the communication device, after the connection to the second communication terminal, and transmits information indicating termination of the permission to the communication device upon confirming the permission is to be terminated, and upon receiving the information indicating termination of the permission, the communication device terminating the connection with the second communication terminal.

5. The communication system according to claim 1, wherein,
   the first communication terminal displays information whether to terminate the permission on a display screen, receives an input operation for terminating the permission, and transmits the information to terminate the permission to the communication device in accordance with the input operation for terminating the permission.

6. The communication system according to claim 1, wherein,
   in a case that the communication device is able to receive information from the first communication terminal, the communication device controls the communication device in accordance with information from the first communication terminal, wherein, in a case that the communication device is unable to receive information from the first communication terminal, the communication device terminates the connection with the second communication terminal.

7. The communication system according to claim 1, wherein,
for the permission, the first communication terminal transmits, to the second communication terminal, connection information necessary for a connection through short range communication with the second communication terminal, and the second communication terminal transmits address information on the second communication terminal to the first communication terminal, the first communication terminal transmits the address information on the second communication terminal to the communication device, the communication device registers the address information on the second communication terminal into a permission list, the second communication terminal connects to the communication device by using the connection information, upon confirming the permission is to be terminated, the first communication terminal causes the communication device to deletes the address information on the second communication terminal from the permission list of the communication device, and, upon the address information on the second communication terminal being not registered in the permission list, the communication device terminates the connection with the second communication terminal.

8. The communication system according to claim 1, wherein,
for the permission, the first communication terminal transmits, to the second communication terminal, connection information necessary for a connection through short range communication with the second communication terminal, and the second communication terminal transmits address information on the second communication terminal to the first communication terminal, the first communication terminal registers the address information on the second communication terminal into a permission list, the second communication terminal connects to the communication device by using the connection information, upon confirming the permission is to be terminated, the first communication terminal causes the communication device to deletes the address information on the second communication terminal from the permission list, and the communication device performs communication for confirmation with the first communication terminal and, upon the address information on the second communication terminal being not registered in the permission list of the communication device, terminates the connection with the second communication terminal.

9. The communication system according to claim 1, wherein,
for the permission, the first communication terminal requests a one-time password from the communication device, and the communication device responds with the one-time password, the first communication terminal transmits, to the second communication terminal, connection information including the one-time password necessary for a connection through short range communication with the second communication terminal, and the second communication terminal connects to the communication device by using the connection information including the one-time password.

10. The communication system according to claim 1, wherein,
for the permission, the second communication terminal performs short range communication with the communication device, the communication device transmits, to the second communication terminal, connection information necessary for a connection, and the second communication terminal transmits address information on the second communication terminal to the communication device, the communication device registers the address information on the second communication terminal into a permission list, the second communication terminal connects to the communication device by using the connection information, upon confirming the permission is to be terminated, the first communication terminal causes the communication device to deletes the address information on the second communication terminal from the permission list of the communication device, and, upon the address information on the second communication terminal being not registered in the permission list, the communication device terminates the connection with the second communication terminal.

11. The communication system according to claim 1, wherein,
for the permission, the second communication terminal requests a one-time password from the communication device through short range communication with the communication device, and the communication device transmits connection information including the one-time password necessary for a connection to the second communication terminal, and the second communication terminal connects to the communication device by using the connection information including the one-time password.

12. The communication system according to claim 1, wherein,
for the permission, the first communication terminal transmits, to the second communication terminal, connection information necessary for a connection through short range communication with the second communication terminal, the second communication terminal connects to the communication device by using the connection information, and in the short range communication, the first communication terminal displays a bar code representing the connection information on a display screen thereof and the second communication terminal captures an image of the bar code with a camera to read the connection information.

13. The communication system according to claim 1, wherein,
the second communication terminal controls the communication device while maintaining the connection with the communication device, and the first communication terminal controls the communication device while maintaining the connection with the communication device via the access point.

14. A communication terminal comprising:
a wireless connection interface configured to connect to a communication device via an access point device; and
a controller configured to control the wireless connection interface and to transmit a command to remotely control a display operation on the communication device connected with the communication terminal,
wherein the controller is configured to transmit permission to establish a connection for the communication device and another communication terminal, wherein, while the communication device outputs data received from the another communication terminal that has established the connection with the communication device, the controller is configured to transmit the command to control how to display the data while the communication device and the another communication terminal are connected, and wherein, when the controller transmits information to terminate the permission from the communication terminal, the controller is configured to transmit the information to terminate the connection with the another communication terminal to the communication device.

15. A communication device comprising:

a wireless connection interface configured to connect to a communication terminal and another communication terminal; and a controller configured to control the wireless connection interface, wherein the wireless connection interface is configured to connect to the communication terminal via an access point device, wherein the controller is configured to control to establish a connection with the another communication terminal, if having permission from the communication terminal, and control data received from the another communication terminal, wherein, while the controller controls the data received from the another communication terminal and upon receiving at the wireless communication interface, from the communication terminal, a command to remotely control how the data received from the another communication terminal is displayed, the controller is configured to control the data received from the another communication terminal in accordance with the command from the communication terminal while maintaining the connection with the another communication terminal, and wherein, when the wireless communication interface receives information to terminate the permission from the communication terminal, the controller is configured to terminate the connection with the another communication terminal.

\* \* \* \* \*